United States Patent
Lee et al.

(10) Patent No.: US 12,087,019 B2
(45) Date of Patent: Sep. 10, 2024

(54) IMAGE COMPRESSION METHOD USING SATURATED PIXEL, ENCODER, AND ELECTRONIC DEVICE

(71) Applicant: SAMSUNG ELECTRONICS CO., LTD., Suwon-si (KR)

(72) Inventors: Wonseok Lee, Suwon-si (KR); Suhyun Jo, Busan (KR); Yunseok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 458 days.

(21) Appl. No.: 17/350,058

(22) Filed: Jun. 17, 2021

(65) Prior Publication Data
US 2022/0020180 A1  Jan. 20, 2022

(30) Foreign Application Priority Data

Jul. 16, 2020 (KR) .................. 10-2020-0088453
Jan. 21, 2021 (KR) .................. 10-2021-0008910

(51) Int. Cl.
*G06T 9/00* (2006.01)
*G06T 3/40* (2006.01)
(Continued)

(52) U.S. Cl.
CPC .................. *G06T 9/00* (2013.01); *G06T 3/40* (2013.01); *H04N 19/105* (2014.11);
(Continued)

(58) Field of Classification Search
CPC .......... G06T 9/00; G06T 3/40; H04N 19/105; H04N 19/182; H04N 19/186; H04N 19/46
See application file for complete search history.

(56) References Cited

U.S. PATENT DOCUMENTS

| | | | |
|---|---|---|---|
| 5,479,211 A | 12/1995 | Fukuda | |
| 8,081,242 B2 | 12/2011 | Shiraishi | |
| (Continued) | | | |

FOREIGN PATENT DOCUMENTS

| | | |
|---|---|---|
| CN | 110557637 A | 12/2019 |
| JP | 2011-24809 A | 2/2011 |
| (Continued) | | |

OTHER PUBLICATIONS

Communication issued on Feb. 2, 2024 by Taiwan Intellectual Property Office in corresponding Taiwanese Patent Application No. 110125622.

*Primary Examiner* — Pinalben Patel
(74) *Attorney, Agent, or Firm* — Sughrue Mion, PLLC

(57) ABSTRACT

Provided is an image compression method for compressing image data generated by an image sensor, the image compression method including detecting a saturated pixel among a plurality of pixels included in a pixel group included in the image data, the saturated pixel having a pixel value exceeding a threshold value, and the plurality of pixels being adjacent to each other and having a same color as each other, generating a saturation flag indicating a position of the saturated pixel, compressing the image data by comparing a reference pixel with at least one non-saturated pixel among the plurality of pixels included in the pixel group, and outputting a bitstream including the saturation flag, a compression result, and a compression method.

20 Claims, 19 Drawing Sheets

(51) Int. Cl.
*H04N 19/105* (2014.01)
*H04N 19/182* (2014.01)
*H04N 19/186* (2014.01)
*H04N 19/46* (2014.01)

(52) U.S. Cl.
CPC ......... *H04N 19/182* (2014.11); *H04N 19/186* (2014.11); *H04N 19/46* (2014.11)

(56) References Cited

U.S. PATENT DOCUMENTS

| | | |
|---|---|---|
| 8,269,852 B2 | 9/2012 | Shiraishi et al. |
| 9,030,572 B2 | 5/2015 | Tha |
| 9,596,478 B2 | 3/2017 | Satomi et al. |
| 9,916,809 B2 | 3/2018 | Ballestad et al. |
| 10,110,797 B2 | 10/2018 | Ono |
| 10,609,416 B2 * | 3/2020 | Novotny ................. H04N 5/21 |
| 10,631,016 B2 | 4/2020 | Hosoda |
| 10,848,696 B2 | 11/2020 | Lee |
| 2005/0047650 A1 | 3/2005 | Kagaya |
| 2016/0360196 A1 * | 12/2016 | Endo ................... H04N 19/136 |
| 2017/0034422 A1 * | 2/2017 | Ono ................... H01L 27/14641 |
| 2017/0070753 A1 * | 3/2017 | Kaneko ................ H04N 19/146 |
| 2019/0089993 A1 * | 3/2019 | Hosoda ............... H04N 1/6058 |

FOREIGN PATENT DOCUMENTS

| | | |
|---|---|---|
| JP | 2019-121974 A | 7/2019 |
| KR | 10-0648127 B1 | 11/2006 |

\* cited by examiner

FIG. 13A

| MIPI MODE NAME | MODE NUMBER | HEADER | | | |
|---|---|---|---|---|---|
| PD MODE | MODE0 | 0 | 0 | 0 | 0 |
| | MODE1 | 0 | 0 | 0 | 1 |
| | MODE2 | 0 | 0 | 1 | 0 |
| | MODE3 | 0 | 0 | 1 | 1 |
| | MODE12 | 1 | 1 | 0 | 0 |
| | MODE13 | 1 | 1 | 0 | 1 |
| DGD MODE | MODE4 | 0 | 1 | 0 | 0 |
| | MODE5 | 0 | 1 | 0 | 1 |
| | MODE8 | 1 | 0 | 0 | 0 |
| | MODE9 | 1 | 0 | 0 | 1 |
| | MODE10 | 1 | 0 | 1 | 0 |
| | MODE11 | 1 | 0 | 1 | 1 |
| eSHV MODE | MODE14 | 1 | 1 | 1 | 0 |
| | MODE15 | 1 | 1 | 1 | 1 |
| OUT MODE | MODE7 | 0 | 1 | 1 | 1 |
| FNR MODE | MODE6 | 0 | 1 | 1 | 0 |

FIG. 13B

| MIPI MODE NAME | MODE NUMBER | HEADER | | | |
|---|---|---|---|---|---|
| PD MODE | MODE0 | 0 | 0 | 0 | 0 |
| | MODE1 | 0 | 0 | 0 | 1 |
| | MODE2 | 0 | 0 | 1 | 0 |
| | MODE3 | 0 | 0 | 1 | 1 |
| eHVD MODE | MODE12 | 1 | 1 | 0 | 0 |
| | MODE13 | 1 | 1 | 0 | 1 |
| OD MODE | MODE4 | 0 | 1 | 0 | 0 |
| | MODE5 | 0 | 1 | 0 | 1 |
| eHPD MODE | MODE8 | 1 | 0 | 0 | 0 |
| | MODE9 | 1 | 0 | 0 | 1 |
| | MODE10 | 1 | 0 | 1 | 0 |
| | MODE11 | 1 | 0 | 1 | 1 |
| eHVA MODE | MODE14 | 1 | 1 | 1 | 0 |
| (e)OUT MODE | MODE15 | 1 | 1 | 1 | 1 |
| | MODE7 | 0 | 1 | 1 | 1 |
| FNR MODE | MODE6 | 0 | 1 | 1 | 0 |

IMAGE COMPRESSION METHOD USING SATURATED PIXEL, ENCODER, AND ELECTRONIC DEVICE

CROSS-REFERENCE TO THE RELATED APPLICATIONS

This application is based on and claims priority to Korean Patent Application No. 10-2020-0088453, filed on Jul. 16, 2020 and Korean Patent Application No. 10-2021-0008910, filed on Jan. 21, 2021, in the Korean Intellectual Property Office, the disclosures of which are incorporated by reference herein in their entireties.

BACKGROUND

1. Field

Example embodiments of the present disclosure relate to an image compression method, and more particularly, to an image compression method using a saturated pixel, an encoder, and an electronic device.

2. Description of Related Art

With the increasing demand for high-resolution images, the size of image data generated by image sensors is increasing. Because the size of image data is related to a data transfer rate, a method of efficiently compressing the image data is required.

To decrease the size of image data, a method of compressing data based on a difference between a target pixel to be compressed and a reference pixel for compression is used. However, saturation of a pixel involved in excessive light reception generates a large pixel value, and thus, causes a decrease in a compression rate of the compression method based on the difference between the target pixel and the reference pixel.

SUMMARY

One or more example embodiments provide a method of efficiently compressing a saturated pixel.

According to an aspect of an example embodiment, there is provided an image compression method for compressing image data generated by an image sensor, the image compression method including detecting a saturated pixel among a plurality of pixels included in a pixel group included in the image data, the saturated pixel having a pixel value exceeding a threshold value, and the plurality of pixels being adjacent to each other and having a same color as each other, generating a saturation flag indicating a position of the saturated pixel, compressing the image data by comparing a reference pixel with at least one non-saturated pixel among the plurality of pixels included in the pixel group, and outputting a bitstream including the saturation flag, a compression result, and a compression method.

According to another aspect of an example embodiment, there is provided an encoder for processing image data generated by an image sensor, the encoder configured to detect a saturated pixel among a plurality of pixels included in a pixel group, the saturated pixel having a pixel value exceeding a threshold value, and the plurality of pixels being adjacent to each other and having a same color as each other, generate a saturation flag indicating a position of the saturated pixel, and compress the image data by comparing a reference pixel with at least one non-saturated pixel among the plurality of pixels included in the pixel group.

According to another aspect of an example embodiment, there is provided an electronic device capturing an image, the electronic device including an image sensor including a pixel array and configured to output image data, an image signal processor including an encoder, the encoder being configured to detect a saturated pixel among a plurality of pixels included in a pixel group, the saturated pixel having a pixel value exceeding a threshold value, and the plurality of pixels being adjacent to each other and having a same color as each other, generate a saturation flag indicating a position of the saturated pixel, compress the image data by comparing a reference pixel with at least one non-saturated pixel among the plurality of pixels included in the pixel group, and output a bitstream including a compression result, the saturation flag, and a compression method, and an application processor including a decoder, the decoder being configured to reconstruct the image data by decoding the bitstream.

BRIEF DESCRIPTION OF THE DRAWINGS

The above and/or other aspects, features, and advantages of example embodiments will be more clearly understood from the following detailed description, taken in conjunction with the accompanying drawings, in which:

FIGS. 13A and 13B are tables of compression information according to example embodiments;

DETAILED DESCRIPTION OF THE EMBODIMENTS

Figure 1:
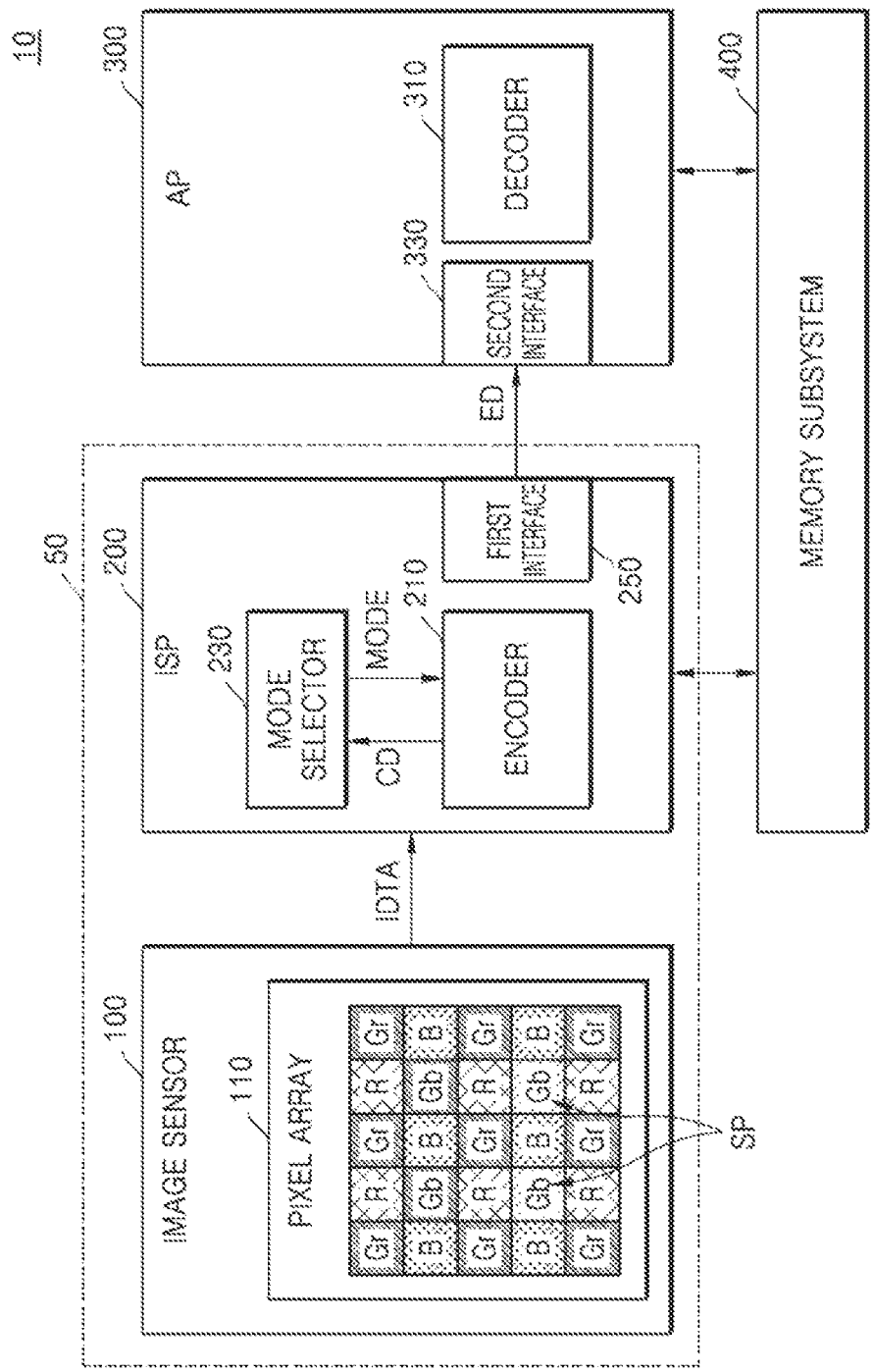
FIG. 1 is a block diagram of an electronic device according to an example embodiment.

Hereinafter, embodiments will be described in detail with reference to the accompanying drawings.

The term "pixel", "pixel group", "color pixel", or "sub-pixel" may refer to a physical region, in which a photosensitive device sensing an object is located, or a data value corresponding to an electrical signal generated by a photosensitive device sensing a portion of an object. The term "color pixel" may be considered as a data value corresponding to an electrical signal generated by a photosensitive device, except for the description of an image sensor. The "pixel" is used as a comprehensive term that includes a color pixel and a sub pixel.

As the integration density and processing speed of semiconductor devices increase, the number of images that may be captured per second also increases, and accordingly, the size of image data stored and processed by an electronic device is gradually increasing. Therefore, a technique of compressing image data for efficient image data processing is desired.

As the number of photosensitive devices, which convert a light signal into an electrical signal, increases, it is easier to generate high-resolution images. As the integration density of photosensitive devices increases, the physical distance between photosensitive devices may decrease, and accordingly, noise such as crosstalk may occur and cause degradation of image quality.

It is more difficult for a significant light signal to be input to a photosensitive device at a low light level, which may be an obstacle to generating high-resolution images. To generate a high-resolution image at a low light level, a plurality of subpixels may be used to express a single color pixel by dividing each of color pixels sharing a single color filter into a plurality of subpixels. When electrical signals generated by the subpixels are added, a significant amount of light may be secured. According to an example embodiment, a single color pixel may be divided into four or nine subpixels. However, the numbers of subpixels are just examples. A color pixel may be divided into a square number such as 16 or 25 or a matrix form such as m×n, where "m" and "n" are integers of at least 2.

To more effectively compress image data, satisfactory compression efficiency and low data loss are required. In a method of compressing an image, a target pixel to be compressed may be determined, a reference pixel may be selected from candidate pixels adjacent to the target pixel, and image data may be compressed based on a difference value between the target pixel and the reference pixel. The compression method based on the pixel difference value may be referred to as differential pulse code modulation (DPCM).

The compression method may also be used when a Bayer image, in which color pixels each including a plurality of subpixels sharing one color filter are arranged in a particular color pattern, is compressed. In an example embodiment, a Bayer pattern may include a known pattern in which green, red, blue, and green are sequentially arranged in a matrix.

FIG. 1 is a block diagram of an electronic device 10 according to an example embodiment.

The electronic device 10 may sense an image of an object using a solid image sensor such as a charge-coupled device (CCD) image sensor or a complementary metal oxide semiconductor (CMOS) image sensor, process the sensed image or store the sensed image in memory, and store the processed image in memory. According to an example embodiment, the electronic device 10 may include, for example, a digital camera, a digital camcorder, a mobile phone, a table computer, or a portable electronic device. The portable electronic device may include a laptop computer, a mobile phone, a smartphone, a tablet personal computer (PC), a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, or a wearable device. The electronic device 10 may also be mounted, as a component, on electronic devices, such as a drone and an advanced drivers assistance system (ADAS), vehicles, furniture, manufacturing facilities, doors, and/or various kinds of measuring equipment. However, embodiments are not limited thereto.

Referring to FIG. 1, the electronic device 10 may include an image sensor 100, an image signal processor (ISP) 200, an application processor (AP) 300, and a memory subsystem 400. The ISP 200 and the AP 300 may include an application specific integrated circuit (ASIC), a field-programmable gate array (FPGA), a dedicated microprocessor, a microprocessor, a general purpose processor, or the like.

The image sensor 100 may convert optical signals of an object, which are received through an optical lens, into electrical signals and generate and output image data IDTA based on the electrical signals. The image sensor 100 may be mounted on an electronic device having an image sensing function or a light sensing function. For example, the image sensor 100 may be mounted on electronic devices such as a camera, a smartphone, a wearable device, an Internet of things (IoT) device, a tablet PC, a PDA, a PMP, a navigation device, a drone, and an ADAS. The image sensor 100 may also be mounted on electronic devices that are used as components of vehicles, furniture, manufacturing facilities, doors, and/or various kinds of measuring equipment. The image sensor 100 may be controlled by the ISP 200 or the AP 300 to sense an object captured through a lens.

The image sensor 100 may include a pixel array 110.

The pixel array 110 may include a plurality of row lines, a plurality of column lines, a plurality of pixels arranged in a matrix form, and a plurality of color filters arranged in correspondence to the respective pixels. Each of the pixels may be connected to a row line and a column line.

Each of the pixels may include a photosensitive device. The photosensitive device may sense light and convert the light into a pixel signal that is an electrical signal. For example, the photosensitive device may include a photodiode, a phototransistor, a photogate, a pinned photo diode (PPD), or a combination thereof. The photosensitive device may have a four-transistor structure including a photodiode, a transfer transistor, a reset transistor, an amplifier transistor, and a select transistor. According to an example embodiment, the photosensitive device may have, for example, a one-transistor structure, a three-transistor structure, a four-transistor structure, or a five-transistor structure or may have a structure in which some transistors are shared by a plurality of pixels.

A color filter may be arranged to correspond to one of the pixels included in the pixel array 110 and may transmit only a particular wavelength of light incident to a photosensitive device. In an example embodiment, the color filter may include a Bayer color filter. A Bayer pattern is based on the assumption that human eyes derive most of luminance data from a green component of an object. Half of pixels included in a Bayer color filter may detect a green signal, one-fourth of the pixels may detect a red signal, and the remaining one-fourth of the pixels may detect a blue signal. According to an example embodiment, the Bayer color filter may have a configuration, in which 2×2 color pixels including a red pixel, a blue pixel, and two green pixels are repeatedly arranged. According to an example embodiment, the Bayer color filter may have a configuration, in which 2×2 color pixels including a red pixel, a blue pixel, and two wide green pixels are repeatedly arranged. In an example embodiment, an RGB color filter, in which a green filter is arranged for two of four pixels and a blue filter and a red filter are respectively arranged for the other two pixels, may be used. However, embodiments are not limited thereto. For example, a CYGM color filter, in which cyan, yellow, green, and magenta color filters are respectively arranged for four pixels, may be used. In addition, a cyan, yellow, green, and key (CYMK) color filter may also be used. A plurality of color filters may form a single color filter layer. A Bayer pattern is used as an example, but embodiments are not limited to the Bayer pattern. Various patterns, in which white or yellow is included or at least two color regions are merged, may be used.

The image sensor 100 may further include a plurality of modules, which process pixel signals generated by the pixel array 110. According to an example embodiment, the modules may include additional components, such as a row driver, a ramp signal generator, a timing generator, an analog-to-digital converter, and a readout circuit, for processing an optical signal or enhancing an image sensing ability. For example, the readout circuit may generate raw data based on an electrical signal of the pixel array 110 and output, as the image data IDTA, the raw data as it is or raw data that underwent preprocessing such as bad pixel removal. The image sensor 100 may be implemented in a semiconductor chip or package including the pixel array 110 and the readout circuit.

The image sensor 100 may output the image data IDTA by processing a pixel signal, which is generated by the pixel array 110, using a plurality of modules.

The image data IDTA is a result of processing a pixel signal using a plurality of modules, for example, a ramp signal generator and a readout circuit. In an example embodiment, the image data IDTA may include binary code. In an example embodiment, the image data IDTA may include pixel information of an object and a pixel value. For example, the image data IDTA may include pixel information such as a position of a photosensitive device, which senses a particular portion of an object, in the pixel array 110, a color of a pixel that is the type of a color filter, etc. In an example embodiment, the image data IDTA may include a pixel value involved in a dynamic range of data, which may be processed by the image sensor 100. For example, as the dynamic range for an individual pixel is ten bits, the image data IDTA may include a sensed pixel value among pixel values of 0 to 1023 as data about the individual pixel.

In an example embodiment, a set of pixel values may be referred to as a Bayer image. At this time, the Bayer image may be distinguished from a color filter, which physically transmits a particular wavelength of light. In an example embodiment, the Bayer image may correspond to an abstract shape, as which an image sensed by the image sensor 100 is recognized by the ISP 200, the AP 300, or a user interface. The Bayer image may be image data including pixel information of a complete image, which is treated as a single processing unit in the electronic device 10. Image data may be described using the term "Bayer image" in this specification, but it will be considered that embodiments may use color filters having various patterns without being limited to a color filter having a Bayer pattern.

The ISP 200 may include a central processing unit (CPU), a microprocessor, or a micro controller unit (MCU). Processing that is performed by the ISP 200 may refer to applying an image enhancement algorithm to image artifacts. For example, the ISP 200 may perform white balancing, denoising, demosaicking, lens shading, gamma correction, and/or the like on a received image frame but is not limited thereto. The ISP 200 may perform various types of image post-processing.

The ISP 200 may perform image processing on the image data IDTA. For example, the ISP 200 may perform image processing on the image data IDTA to change a data format, for example, to change a Bayer pattern into a YUV format or an RGB format, or image processing, such as denoising, brightness adjustment, and/or sharpness adjustment, for enhancing image quality. The ISP 200 may form the hardware of the electronic device 10. Although the ISP 200 is separate from the image sensor 100 in FIG. 1, embodiments are not limited thereto. The ISP 200 may be provided integrally with the image sensor 100 or the AP 300.

According to an example embodiment, the ISP 200 may receive the image data IDTA that is an output signal of the image sensor 100 and generate encoded data ED that is a result of processing the image data IDTA. The encoded data ED may be provided to the outside through a first interface 250.

The ISP 200 may include an encoder 210, a mode selector 230, and the first interface 250. According to an example embodiment, the ISP 200 may receive the image data IDTA and output the encoded data ED.

The encoder 210 may reduce a data size by compressing the image data IDTA and may encode the image data IDTA according to an image standard such that the image data IDTA may be processed by a processor, for example, the AP 300. According to an example embodiment, the encoder 210 may generate compressed data CD by compressing the image data IDTA and output the compressed data CD to the mode selector 230. According to an example embodiment, the encoder 210 may receive a mode signal MODE from the mode selector 230 and generate the encoded data ED by performing encoding according to a compression mode.

According to an example embodiment, when the encoder 210 compresses the image data IDTA, the encoder 210 may compare all pixels of the image data IDTA, which includes pixel values obtained by sensing an object, except for a saturated pixel SP receiving excessive light, with a reference pixel, which has the same color information as the saturated pixel SP and is adjacent to the saturated pixel SP.

According to an example embodiment, the saturated pixel SP may correspond to data having a pixel value generated by receiving excessive light. According to an example embodiment, the saturated pixel SP includes data of a pixel representing bright light so that human eyes cannot clearly discern a difference from a greatest brilliancy. The saturated pixel SP may have a pixel value slightly different from a maximum pixel value that may be represented by a pixel but has little effect on the resolution of an image.

In an example embodiment, the saturated pixel SP may have a pixel value greater than a threshold value in a dynamic range, which is a data size that an individual pixel may have. According to an example embodiment, the threshold value may correspond to a pixel value that is close to an upper limit of the dynamic range of an individual pixel. For example, when the dynamic range of an individual pixel is ten bits that is when a pixel includes ten bits of information, the individual pixel may have a pixel value of 0 to 1023, and the threshold value may be 1000. At this time, a pixel having a pixel value that is greater than or equal to 1000 may be classified as the saturated pixel SP. For example, the threshold value may correspond to 95% of the upper limit of the dynamic range of an individual pixel but is not limited thereto.

A threshold value, based on which a pixel is classified as the saturated pixel SP, may vary with the dynamic range of an individual pixel, an image-capturing environment, or a required resolution.

According to an example embodiment, as the dynamic range of an individual pixel decreases, the threshold may change in proportion to the decrease in the upper limit of a pixel value. For example, when the dynamic range is eight bits, the dynamic range of an individual pixel may be 0 to 255, and the threshold value may be 230. For example, when the dynamic range is twelve bits, the dynamic range of an individual pixel may be 0 to 4191, and the threshold value may be 4000.

According to an example embodiment, when the image-capturing environment generates many saturated pixels, the threshold value may be increased. For example, when the image-capturing environment is outdoors or a situation where there is lots of backlight, the threshold value may be 1020. For example, when the image-capturing environment is indoors or a situation where there is little backlight, the threshold value may be 950.

According to an example embodiment, when a high resolution is required, the threshold value may be set to be closer to the upper limit of the dynamic range of an individual pixel. For example, when a high resolution is required, the threshold value of a 10-bit pixel may be 1020. For example, when a low resolution is required, the threshold value of a 10-bit pixel may be 980.

The threshold value is not limited to the particular figures given above and may be variably changed to achieve an optimal compression rate.

In an example embodiment, a reference pixel may be one of a plurality of pixels. The reference pixel may have the same color as a target pixel to be compressed. The reference pixel may be compressed prior to the target pixel. The reference pixel may be reconstructed prior to the target pixel and thus be referred to when the target pixel is decoded. The reference pixel may be located in a predetermined direction and distance from the target pixel.

In an example embodiment, the reference pixel may include a virtual pixel having a certain value. For example, the reference pixel may refer to a virtual pixel, which has an average pixel value of a plurality of pixels or a median pixel value of respective pixel values of the pixels, wherein the respective pixel values are sorted in ascending (or descending) order. The relationship between the reference pixel and the target pixel will be described in detail with reference to FIGS. 5A and 5B.

The encoder 210 may generate the encoded data ED by encoding the image data IDTA. The encoded data ED may be output as a bitstream. The ISP 200 may perform reading and writing of data stored in the memory subsystem 400 while encoding the image data IDTA.

The encoder 210 may reduce the size of a Bayer image by compressing the image data IDTA, which corresponds to original pixel data obtained through a Bayer color filter. The Bayer image may refer to Bayer-pattern pixel data obtained through the pixel array 110.

According to an example embodiment, the encoder 210 may classify a pixel, which has a pixel value greater than a threshold value in the image data IDTA, as the saturated pixel SP. According to an example embodiment, the encoder 210 may determine a reference pixel, which is physically adjacent to the saturated pixel SP among candidate pixels including the same color information as the saturated pixel SP. According to an example embodiment, the encoder 210 may compare the pixel value of a target pixel to be compressed with the pixel value of the reference pixel to reduce the amount of data.

When an image of an object is captured, there may be a large pixel value difference between a target pixel to be compressed and a candidate pixel or a reference pixel, which is located near the target pixel. The large pixel value difference may be caused by a spot pixel occurring when an image sensed by the image sensor 100 has a relatively small size compared to other surrounding objects and has a large contrast in brightness or color, a bad pixel occurring when there is an sensing error of the image sensor 100, an edge pixel in a corner of a Bayer image, a situation where there is lots of backlight in an image-capturing environment, or an outdoor image-capturing environment. In those cases, because there is a large difference between a candidate pixel referred to for compression and an adjacent pixel, a compression rate may greatly decrease or image quality may be degraded. Accordingly, it is necessary to perform compression by taking into account cases of a large pixel value difference between the target pixel and each of other adjacent pixels. When a flag is considered during the compression, image quality may be prevented from degrading. A method of compressing data based on a comparison, for example, a subtraction between the target pixel and the reference pixel may be as DPCM.

Because the image data IDTA is encoded or decoded row by row from left to right, it is necessary to encode or decode the reference pixel, which is to be compared with the target pixel, in advance. Therefore, according to an example embodiment, the reference pixel may be on the left or upper side of the target pixel. However, embodiments are not limited thereto. One of pixels, which are adjacent to a saturated pixel and in a region that has undergone encoding or decoding according to an encoding or decoding order, may be determined as the reference pixel. For example, among pixels having the same color information as the saturated pixel SP, a pixel that is closest to the saturated pixel SP located on the left may be determined as the reference pixel. At this time, the relative position between the saturated pixel SP and the reference pixel or the relative position between the target pixel and the reference pixel may be determined. As the reference pixel is determined, the relative position of the reference pixel with respect to the target pixel is also shared by a decoder 310. The position of the reference pixel may be related to the position of the saturated pixel SP.

According to an example embodiment, the encoder 210 may compress data in units of pixel groups, wherein each pixel group includes a set of pixels. According to an example embodiment, when a pixel group includes a saturated pixel, the encoder 210 may generate only position information of the saturated pixel without compressing the saturated pixel. According to an example embodiment, when the encoder 210 stores only the position information of the saturated pixel without compressing the saturated pixel, which causes a compression rate to decrease, the encoder 210 may reallocate a space, in which the saturated pixel is stored, for another pixel.

According to an example embodiment, the encoder 210 may generate a bitstream by compressing a pixel group. According to an example embodiment, the bitstream may include a header, which indicates a compression method, a compression mode, a compression rate, loss information, or the like, a saturation position flag including position information of a saturated pixel, and residual information indicating a pixel value difference between a target pixel to be compressed and a reference pixel. According to an example embodiment, when a pixel value difference between the saturated pixel and the reference pixel is not stored in the bitstream, the limited space of the bitstream may be allocated for a non-saturated pixel, and accordingly, a data loss rate of the non-saturated pixel may be reduced. The structures of a bitstream will be described with reference to FIGS. 6 through 11.

A process of encoding the image data IDTA using the encoder 210 will be described in detail with reference to FIGS. 2 and 6 through 12.

The mode selector 230 may receive the compressed data CD and determine a compression mode, in which the image data IDTA is encoded, among a plurality of compression modes. According to an example embodiment, the ISP 200 may have various compression modes according to a target to be compressed, a compression rate, an error rate, and/or loss information. According to an example embodiment, the mode selector 230 may check and compare the compression rate, error rate, and loss information of the compressed data CD in a current compression mode with those in other compression modes.

According to an example embodiment, when the compressed data CD shows better performance than the results of other compression modes, the mode selector 230 may output the mode signal MODE, which instructs to encode the image data IDTA in a compression mode in which the compressed data CD has been generated, to the encoder 210. In an example embodiment, when the compressed data CD does not show better performance than the results of other compression modes, the mode selector 230 may output the mode signal MODE, which instructs to encode the image data IDTA in a better compression mode than the compression mode in which the compressed data CD has been generated. As a compression mode, a saturation mode, in which a saturated pixel in a pixel group is not compressed, or a bad pixel mode, in which a bad pixel is detected, may be used. Different compression modes will be described in detail with reference to FIGS. 13A and 13B.

The first interface 250 may support interfacing between devices such that the encoded data ED is transmitted according to a standard suitable for another device or module. An interface is a physical protocol or standard allowing data and/or signals to be smoothly transmitted between devices having different standards and configurations from each other.

In an example embodiment, to transmit the encoded data ED to the AP 300, the first interface 250 may transmit data using the same interface as the AP 300 supports. In an example embodiment, to store the encoded data ED in the memory subsystem 400, the first interface 250 may transmit data using the same interface as the memory subsystem 400 supports.

A camera module 50 may include the image sensor 100 and the ISP 200. The encoded data ED generated by the camera module 50 may be output as a bitstream. The encoded data ED may be decoded by a device, for example, the decoder 310, which shares the same protocol with the camera module 50. A protocol includes rules of a compression algorithm involving a compression method, a compression order, a compression bit, the position of a reference pixel, or the like and may refer to a mutual agreement allowing decoding to be performed using the same principle as encoding. In an example embodiment, the encoded data ED generated by the camera module 50 may be decoded using a protocol, which is just the same as a protocol applied to the encoder 210 of the camera module 50, and accordingly, the decoder 310 does not need to be mounted on the same semiconductor chip as the encoder 210. According to an example embodiment, the manufacturer of the camera module 50 may be different from the manufacturer of the AP 300.

Although the camera module 50 does not include memory in FIG. 1, embodiments are not limited thereto. According to an example embodiment, the camera module 50 may include part of the memory of the memory subsystem 400. For example, the camera module 50 may include dynamic random access memory (DRAM) as part of the memory of the memory subsystem 400. However, embodiments are not limited thereto. For example, the camera module 50 may include various kinds of memory, such as static RAM (SRAM), which supports high-speed data access. When memory is included in the camera module 50, the camera module 50 may has a 3-stack structure.

The AP 300 may include a CPU, a microprocessor, or an MCU. The AP 300 may perform post-processing on a decoded bitstream output from the decoder 310. The post-processing may refer to applying of an image enhancement algorithm to image artifacts. For example, the AP 300 may perform white balancing, denoising, demosaicking, lens shading, gamma correction, and the like on the decoded bitstream, but is not limited thereto. The AP 300 may perform various functions to enhance image quality.

The AP 300 may include the decoder 310 and a second interface 330.

The second interface 330 may receive the encoded data ED as a bitstream generated by the encoder 210. The second interface 330 may receive data according to the same protocol as the first interface 250. In an example embodiment, a mobile industry processor interface (MIPI) alliance may be used by the first interface 250 and the second interface 330. MIPI is a protocol agreed by the MIPI Alliance and is a communication protocol defined in common by mobile device manufacturers with respect to an interface method and specification. However, the interface method is not limited thereto, and various data communications and signal input/output protocols may be used.

The second interface 330 may interface with the encoded data ED in a data communication format suitable for the AP 300 and provide the encoded data ED to the decoder 310.

The decoder 310 may decode the encoded data ED. In an example embodiment, the decoder 310 may reconstruct the original pixel value of a compressed target pixel by performing a series of processes of encoding the image data IDTA, which have been performed by the encoder 210, in reverse order. For example, the decoder 310 may reconstruct the image data IDTA that has been compressed by the encoder 210.

In an example embodiment, the decoder 310 may use the same protocol as the encoder 210. The decoder 310 may use a decoding method based on an algorithm corresponding to an encoding method used by the encoder 210. According to an example embodiment, the relative position of a reference pixel with respect to a target pixel may be preset in the decoder 310, the relative position being determined by the encoder 210. For example, as a pixel, which is located closest on the left to the saturated pixel SP, among pixels including the same color information as the saturated pixel SP is determined as the reference pixel, the decoder 310 may decode the target pixel to be decoded based on the pixel value of the reference pixel, which has the same color information as the target pixel and is located on the left of the target pixel. According to an example embodiment, the decoder 310 may reconstruct the target pixel using a relatively small amount of data by decoding the image data IDTA based on relative position information between the target pixel and the reference pixel. The decoding operation of the decoder 310 will be described in detail with reference to FIG. 3.

The memory subsystem 400 may store the image data IDTA, the compressed data CD, and/or the encoded data ED, which are provided from the image sensor 100 or the ISP 200. The memory subsystem 400 may store reconstructed data, which is generated by decoding the encoded data ED. The memory subsystem 400 may provide stored data to other elements of the electronic device 10. The memory subsystem 400 may also store various types of systems or user data necessary to drive the electronic device 10.

The memory subsystem 400 may include volatile or non-volatile memory. For example, the memory subsystem 400 may include non-volatile memory, which stores various types of information in a non-volatile manner, and volatile memory, to which information such as firmware related to the driving of the electronic device 10 is loaded. The volatile memory may include DRAM, SRAM, or the like. The non-volatile memory may include read-only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), or the like.

In an example embodiment, a part of the memory subsystem 400 may store data of the ISP 200, and the other part of the memory subsystem 400 may store data of the AP 300 and provide a cache memory function. Although it is illustrated in FIG. 1 that the memory subsystem 400 supports both the ISP 200 and the AP 300, this is just for conceptually and functionally describing that the memory subsystem 400 supports storage or cache memory functions. The ISP 200, the AP 300, and the memory subsystem 400 are not necessarily mounted on one semiconductor chip.

In an example embodiment, a part of the memory subsystem 400 may be used as a memory device storing data of the ISP 200 and may function as a buffer temporarily storing at least part of the image data IDTA.

According to an example embodiment, the memory subsystem 400 may buffer data corresponding to the first row of the image data IDTA. Subpixels may be arranged in a matrix, and the encoder 210 may compress data only after receiving all pixel information of a pixel. Accordingly, the data corresponding to the first row of the image data IDTA does not need to be processed immediately.

When data corresponding to the second row of the image data IDTA is provided to the encoder 210, the ISP 200 may load the data corresponding to the first row of the image data IDTA to the memory subsystem 400. The encoder 210 may compress data of the pixel based on the data corresponding to the first row of the image data IDTA and the data corresponding to the second row of the image data IDTA. The compressed data may be stored in the memory subsystem 400.

The ISP 200 and the AP 300 may be implemented as a processing circuit, such as a hardware component including a logic circuit, or implemented by a combination of hardware and software, such as a processor executing software performing compression. In particular, the processing circuit may include a CPU, an arithmetic logic unit performing arithmetic and logical operations, bit shift, or the like, a digital signal processor (DSP), a microprocessor, an application specific integrated circuit (ASIC), or the like but is not limited thereto.

According to example embodiments, an image compression method may increase the number of bits allocated to a non-saturated pixel by not compressing a saturated pixel causing the decrease in a compression rate. As the number of bits allocated to a non-saturated pixel is increased, degradation of image quality may be decreased and a compression rate may be increased.

Figure 2:
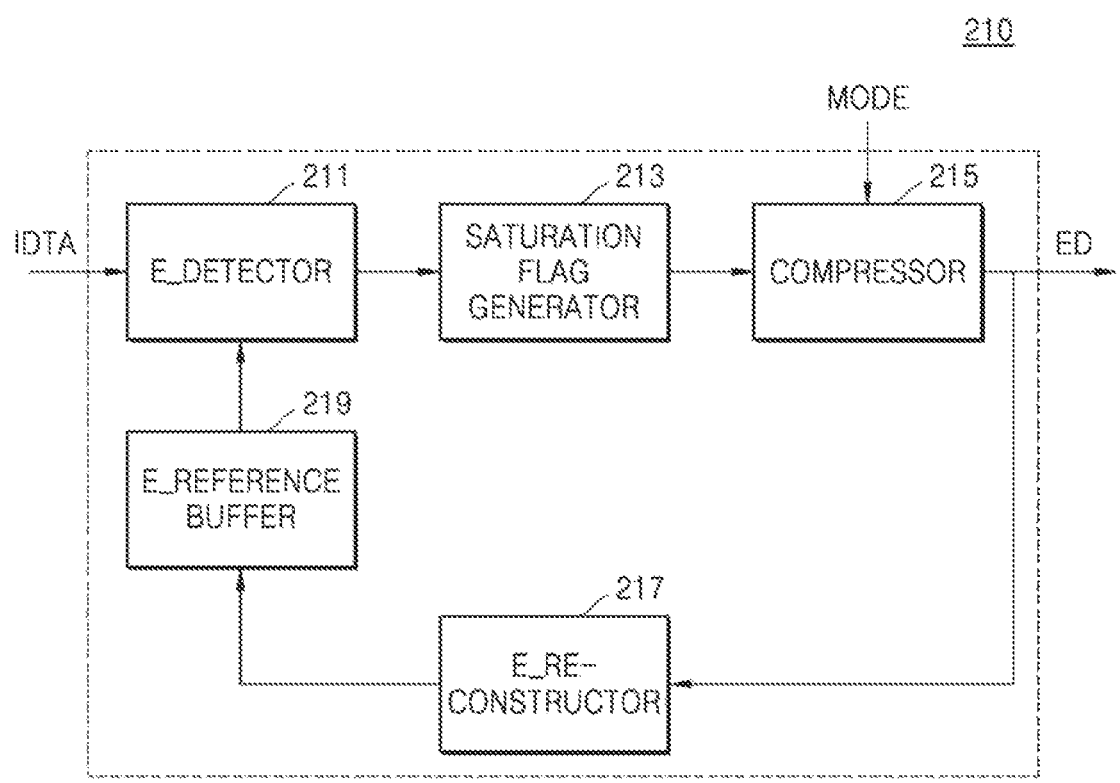
FIG. 2 is a block diagram of an encoder according to an example embodiment.

FIG. 2 is a block diagram of the encoder 210 according to an example embodiment. FIG. 1 will also be referred to.

Referring to FIG. 2, the encoder 210 may include an E_detector 211, a saturation flag generator 213, a compressor 215, an E_reconstructor 217, and an E_reference buffer 219. The encoder 210 may also include a central processor, which generally controls the E_detector 211, the E_reference buffer 219, the saturation flag generator 213, the compressor 215, and the E_reconstructor 217. Each of the E_detector 211, the E_reference buffer 219, the saturation flag generator 213, the compressor 215, and the E_reconstructor 217 may be operated by a processor thereof that may mutually and organically operate such that the encoder 210 may operate as a whole. The E_detector 211, the E_reference buffer 219, the saturation flag generator 213, the compressor 215, and the E_reconstructor 217 may be controlled by a processor outside of the encoder 210. The encoder 210 described with reference to FIG. 1 may be applied to the encoder 210 of FIG. 2. Redundant descriptions will be omitted unless different from those given with reference to FIG. 1.

The encoder 210 may reduce the amount of data information by compressing the image data IDTA from the image sensor 100. According to an example embodiment, the encoder 210 may compress the image data IDTA by comparing a target pixel to be compressed in a Bayer image with a plurality of candidate pixels located near the target pixel.

The E_detector 211 may receive the image data IDTA generated by the image sensor 100. The E_detector 211 may divide the pixels of the image data IDTA into groups each having a certain arrangement and a certain number of pixels. A group of pixels may be referred to as a pixel group, and the encoder 210 may process data in units of pixel groups. For example, the E_detector 211 may compress the image data IDTA pixel group by pixel group. Each pixel group may have a two-dimensional array, such as a 3×3 array or a 5×5 array, or have a 1×8 array in which eight pixels are arranged in a row. The 3×3 array, the 5×5 array, and/or the 1×8 array, in which 3, 5, and 1 are the numbers of columns and 3, 5, and 8 are the numbers of rows, are just examples. Embodiments are not limited to the arrays and numbers give above.

According to an example embodiment, the E_detector 211 may detect a target pixel to be compressed and a plurality of candidate pixels located near the target pixel. The number of pixels detected at a time may vary with the configuration and size of a pixel group. The candidate pixels may be located on the left or upper side of the target pixel, but the positions of the candidate pixels may be changed according to an encoding order.

According to an example embodiment, the E_detector 211 may detect an existence of a saturated pixel in a pixel group. According to an example embodiment, the E_detector 211 may determine, as the saturated pixel SP in FIG. 1, a pixel having a pixel value exceeding a threshold value among pixels in a pixel group. For example, when ten bits are allocated to each pixel and the dynamic range of the pixel is 0 to 1023, the threshold value may be determined to be 1000. In this case, the E_detector 211 may determine a pixel, which has a pixel value exceeding 1000, as the saturated pixel SP. The E_detector 211 may tag the pixel, which is determined as the saturated pixel SP, with attribute information, for example, a flag, indicating the saturated pixel SP.

According to an example embodiment, the E_detector 211 may detect the existence of at least two saturated pixels in a pixel group, and the encoder 210 may compress image data in a saturation mode. For example, when at least two saturated pixels are detected in a pixel group, the E_detector 211 may transmit a signal to the encoder 210 such that the encoder 210 operates in the saturation mode regardless of the mode signal MODE. In an example embodiment, the E_detector 211 may use information about a candidate pixel, which has been reconstructed by the E_reconstructor 217 and stored in the E_reference buffer 219, when a new target pixel following an old target pixel that has undergone encoding is encoded. According to an example embodiment, old target pixels that have been encoded may be used as candidate pixels when a new target pixel is compressed or encoded.

The saturation flag generator 213 may generate position information of a saturated pixel in a pixel group in a form of a flag. According to an example embodiment, when a saturated pixel is included in a pixel group that is a processing unit, the saturation flag generator 213 may generate a flag that represents a position of the saturated pixel in the pixel group with a bit. The flag may include a value obtained by numbering direction information of a target pixel and a reference pixel or mapping the direction information to a particular bit value.

According to an example embodiment, the saturation flag generator 213 may process a non-saturated pixel among a plurality of pixels included in a pixel group as a bit 0's and a saturated pixel as a bit 1's. For example, when a pixel group includes four pixels and the second pixel in the pixel group is a saturated pixel, the saturation flag generator 213 may generate a flag of 0100. However, processing a non-saturated pixel as a bit 0's and a saturated pixel as a bit 1's is just an example. The saturation flag generator 213 may allow a non-saturated pixel to be distinguished from a saturated pixel using various methods. For example, the saturation flag generator 213 may process a non-saturated pixel among a plurality of pixels included in a pixel group as a bit 1's and a saturated pixel as a bit 0's. Hereinafter, the above description is applied to bit allocation involved in distinguishing between a non-saturated pixel and a saturated pixel.

The compressor 215 may encode a header, which indicates a compression method, a compression mode, a compression rate, loss information, or the like, a saturation position flag including position information of a saturated pixel, and residual information indicating a pixel value difference between a target pixel to be compressed and a reference pixel and may include an encoding result in a bitstream. The bitstream may be a sequence of encoded bits. In an example embodiment, a bitstream may include a header field storing header information, a saturation flag field storing a saturation flag, and a residual field storing residual information indicating a difference between a reference pixel and a target pixel.

Because the image data IDTA is encoded or decoded row by row from left to right, it is necessary to encode or decode a reference pixel, which is to be compared with a target pixel, in advance. According to an example embodiment, the encoder 210 may determine a pixel, which includes the same color information as the target pixel and is closest on the left to the target pixel, as the reference pixel. In an example embodiment, the decoder 310 receiving the encoded data ED including a flag may immediately determine the reference pixel when decoding the target pixel. However, embodiments are not limited to the positional relationship described above. It will be understood that one of the pixels, which are adjacent to a saturated pixel and in a region that has undergone encoding or decoding according to an encoding or decoding order, may be determined as the reference pixel.

In an example embodiment, the compressor 215 may compress the target pixel based on the predetermined relative position information between the target pixel and the reference pixel. In an example embodiment, the compressor 215 may compare a target pixel to be compressed with a reference pixel, which provides a reference value for compression, based on relative position information, which is predetermined or tagged onto pixel information as an attribute. In an example embodiment, the compressor 215 may locate the reference pixel in a position predetermined from a position of the target pixel and compare a pixel value of the target pixel with a pixel value of the reference pixel. For example, the compressor 215 may perform a differential operation on the pixel value of the target pixel and the pixel value of the reference pixel, which is located directly above the target pixel and includes the same color information as the target pixel. As a result of performing the differential operation, residual information may be generated. Although the differential operation is given as an example of a comparative operation, embodiments are not limited thereto, and various operations may be used. A method of comparing a target pixel with a candidate pixel is not limited thereto. Various comparison methods using an average of pixel values of a plurality of candidate pixels or the like may be used.

According to an example embodiment, the compressor 215 may not perform a differential operation on the saturated pixel SP in the image data IDTA. According to an example embodiment, the compressor 215 may generate residual information as a result of performing a differential operation on a reference pixel and a non-saturated pixel among a plurality of pixels included in a pixel group. However, when the pixel group includes the saturated pixel SP, the compressor 215 may include only a saturation flag, which is generated by the saturation flag generator 213, in a bitstream, without performing the differential operation on the reference pixel and the saturated pixel SP. According to an example embodiment, as the saturated pixel SP is not included in the bitstream, a storage space for the result of performing the differential operation on the saturated pixel SP and the reference pixel may be allocated for a non-saturated pixel in the bitstream. Accordingly, as compared to the case where residual information of the saturated pixel SP is included in the bitstream, the residual information of a non-saturated pixel may be represented using more space, and therefore, a loss rate involved in compression of the non-saturated pixel may be reduced.

The compressor 215 may compress the image data IDTA based on the mode signal MODE. According to an example embodiment, the mode signal MODE may instruct the compressor 215 to differently compress the image data IDTA according to a compression mode, a compression method, a compression rate, and/or loss information.

In an example embodiment, the mode signal MODE may be generated by the mode selector 230 as a result of evaluating the compression rate, error rate, and loss information of the compressed data CD and may indicate one of a plurality of compression modes.

According to an example embodiment, compression methods may include DPCM, in which encoding is performed based on a differential operation of a pixel value of a target pixel and a reference value determined from a reference pixel, and an averaging method, in which encoding is performed based on an average of pixel values of original pixels. An old target pixel that has undergone encoding may be used as a candidate pixel in a DPCM mode, and information about the candidate pixel as the encoded target pixel used in the DPCM mode may be stored in the E_reference buffer 219. Various compression methods will be described in detail with reference to FIGS. 13A and 13B.

In an example embodiment, the compressor 215 may include residual information in a compression field of a bitstream. At this time, the data size of the residual information is greater than the size of memory allocated to the compression field, data loss or image quality degradation may occur when the image data IDTA is compressed. To prevent image quality degradation, the compressor 215 may adjust the data size to the size of allocated memory by performing a bit shift on the residual information included in the compression field.

The compressor 215 may output the encoded data ED as a bitstream. The compressor 215 may also provide the encoded data ED to the E_reconstructor 217 so that an encoded target pixel is decoded.

The E_reconstructor 217 may generate candidate pixels by reconstructing the encoded data ED output from the compressor 215. In an example embodiment, the E_reconstructor 217 may set a configuration similar to that for decoding performed by the decoder 310 in FIG. 1 by decoding the encoded target pixel. While the encoder 210 has all of original pixel information of an old target pixel and encoded and decoded pixel information thereof, the decoder 310 does not have the original pixel information of the old target pixel. For example, when the encoder 210 uses an old original pixel as a candidate pixel and the decoder 310 does not have information about the old original pixel referred to by the encoder 210, an error may occur in a reconstruction result, and accordingly, there may be discordance between the encoder 210 and the decoder 310. Therefore, a pixel obtained by reconstructing an old target pixel that has undergone encoding may be used as a candidate pixel. The E_reconstructor 217 may store a reconstructed pixel in the memory subsystem 400. The E_reconstructor 217 may directly store the reconstructed pixel in the E_reference buffer 219.

The E_reference buffer 219 may provide information about a candidate pixel to the E_detector 211 as data for encoding a target pixel. The candidate pixel is a neighboring pixel adjacent to the target pixel and may have the same color information as the target pixel. According to an example embodiment, the E_reference buffer 219 may include line memories that store pixel values of neighboring pixels of a target pixel, which are necessary to encode the target pixel. According to an example embodiment, the E_reference buffer 219 may include volatile memory such as DRAM or SRAM but is not limited thereto.

According to example embodiments, an image compression method may increase the number of bits allocated to a non-saturated pixel by not compressing a saturated pixel causing the decrease in a compression rate. As the number of bits allocated to a non-saturated pixel is increased, degradation of image quality may be decreased and a compression rate may be increased. In addition, according to example embodiments, an image compression method may achieve lossless compression when there are many saturated pixels.

Figure 3:
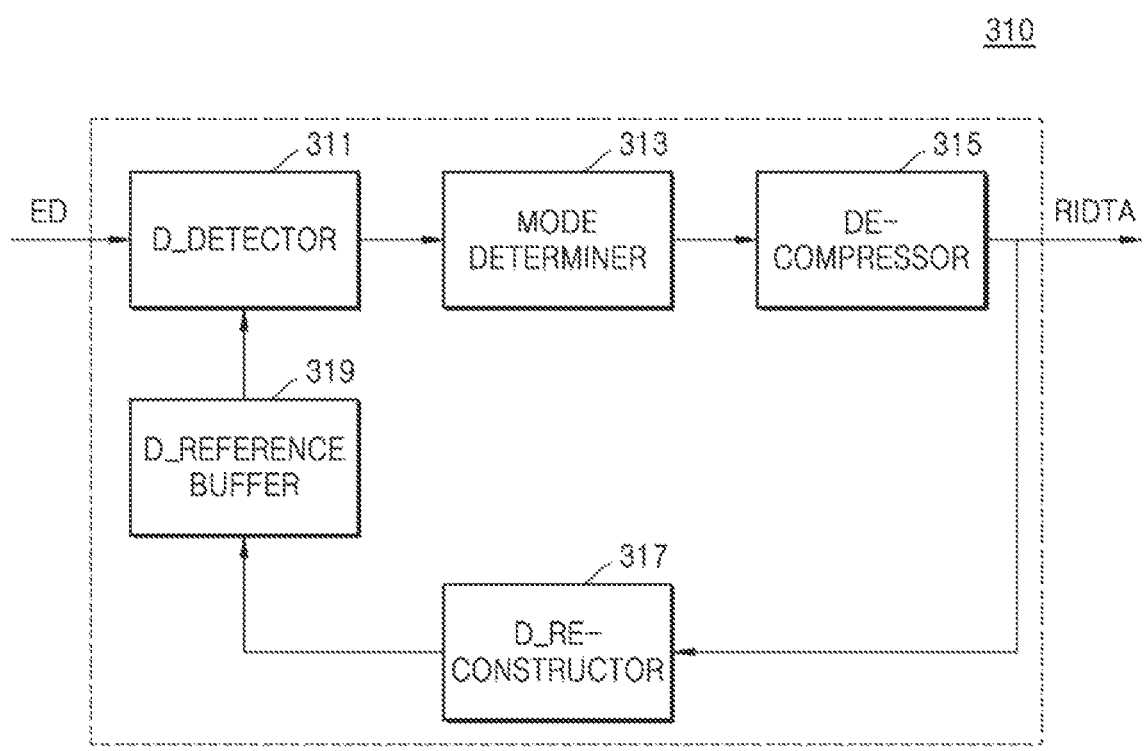
FIG. 3 is a block diagram of a decoder according to an example embodiment.

FIG. 3 is a block diagram of the decoder 310 according to an example embodiment. FIGS. 1 and 2 will also be referred to together with FIG. 3.

The decoder 310 may decode the encoded data ED. In an example embodiment, the decoder 310 may reconstruct or decode the original pixel value of a compressed target pixel by performing a series of processes of encoding the image data IDTA, which have been performed by the encoder 210 of FIG. 2, in reverse order. Consequently, the decoder 310 may reconstruct the image data IDTA that has been compressed by the encoder 210.

In an example embodiment, the decoder 310 may use the same protocol as the encoder 210. The decoder 310 may use a decoding method based on an algorithm corresponding to an encoding method used by the encoder 210. According to an example embodiment, the relative position of a reference pixel with respect to a target pixel may be preset in the decoder 310, the relative position being determined by the encoder 210. For example, the decoder 310 may decode a target pixel to be reconstructed with reference to data reconstructed from a predetermined position of a reference pixel.

In an example embodiment, the decoder may reconstruct the image data IDTA, which has been compressed in pixel group units. A pixel group is a processing unit used by the encoder 210. For example, when a pixel group having a 1×8 array that includes eight pixels arranged in a row is used by the encoder 210, the decoder 310 may also use a pixel group having the 1×8 array.

The decoder 310 may include a D_detector 311, a mode determiner 313, a decompressor 315, a D_reconstructor 317, and a D_reference buffer 319. The decoder 310 may also include a central processor, which generally controls the D_detector 311, the mode determiner 313, the decompressor 315, the D_reconstructor 317, and the D_reference buffer 319. Each of the D_detector 311, the mode determiner 313, the decompressor 315, the D_reconstructor 317, and the D_reference buffer 319 may be operated by a processor thereof, and processors may mutually and organically operate such that the decoder 310 may operate as a whole. The D_detector 311, the mode determiner 313, the decompressor 315, the D_reconstructor 317, and the D_reference buffer 319 may be controlled by a processor outside the decoder 310. Because each of the D_detector 311, the D_reconstructor 317, and the D_reference buffer 319 of the decoder 310 of FIG. 3 is configured to perform a similar function to a corresponding one of the E_detector 211, the E_reconstructor 217, and the E_reference buffer 219 of the encoder 210 of FIG. 2 or to perform an inverse operation of an algorithm performed by the corresponding one of the E_detector 211, the E_reconstructor 217, and the E_reference buffer 219, redundant descriptions will be omitted.

The D_detector 311 may detect a pixel group, which has been used as a unit of encoding, in the encoded data ED. In an example embodiment, the D_detector 311 may detect a pixel group, which is a decoding unit, in the encoded data ED, which has a form of a bitstream of binary code.

The mode determiner 313 may decode the header of a bitstream and identify a compression mode, a compression method, a compression rate, and loss information. According to an example embodiment, as a result of decoding the header, the mode determiner 313 may identify that DPCM has been used as the compression method and that a saturation mode, in which the saturated pixel SP in FIG. 1 is not compressed, has been used as the compression mode. In an example embodiment, the mode determiner 313 may identify that the saturation mode has been used as the compression mode by checking a saturation flag. In an example embodiment, the mode determiner 313 may determine the number of bit shift operations and a sign of comparison result from the header, and may determine a method of comparing a target pixel with a reference pixel for generation of a reconstructed pixel.

The decompressor 315 may reconstruct a target pixel based on the determined compression mode, compression method, compression rate, and loss information. According to an example embodiment, the decompressor 315 may reconstruct a target pixel by identifying the position of a reference pixel based on predetermined relative position information between the target pixel and the reference pixel and adding residual information to the pixel value of the reference pixel. According to an example embodiment, the residual information may include relatively significant data, and accordingly, the reconstruction rate of the target pixel may be increased.

According to an example embodiment, the decompressor 315 may check a saturation flag in the encoded data ED and identify the position of a saturated pixel.

According to an example embodiment, the decompressor 315 may decompress a pixel, which is determined not to be in the position of a saturated pixel, in a pixel group. In the example embodiment, the decompressor 315 may reconstruct a target pixel by performing addition on a non-saturated pixel and a reference pixel. For example, when a first pixel corresponds a bit 0's in a saturation flag, a pixel value of the reference pixel may be added to residual information corresponding to the first pixel to reconstruct the target pixel. A reconstruction result may be output as reconstructed data RIDTA.

According to an example embodiment, when a pixel is determined to be in the position of a saturated pixel in a pixel group, the decompressor 315 may skip reconstruction of a target pixel by adding the pixel value and a reference pixel value. For example, when a second pixel corresponds to a bit 1's in a saturation flag, the target pixel may be reconstructed to have a predetermined saturation value. For example, the second pixel may be reconstructed as a pixel having a saturation value of 1000 as a pixel value.

According to an example embodiment, the decompressor 315 may reconstruct a saturated pixel to have a predetermined reconstruction value as a pixel value. According to an example embodiment, a threshold value used by the decoder 310 may be the same as the threshold value used by the encoder 210 to determine a saturated pixel in a pixel group. According to an example embodiment, a threshold value used by the decoder 310 may be the average of a threshold value, which is used by the encoder 210 to determine a saturated pixel, and the maximum value of the dynamic range of an individual pixel. Besides the values described above, various reconstruction values may be used to increase a reconstruction rate.

The D_reconstructor 317 may reconstruct a target pixel to be subsequently reconstructed by rearranging the reconstructed data RIDTA. In an example embodiment, the D_reconstructor 317 may reconstruct an (N+1)-th row based on the reconstructed data RIDTA of an N-th row, where N is a natural number.

The D_reconstructor 317 may reconstruct data corresponding to a reference pixel earlier than a target pixel to be reconstructed. Because the decoder 310 sequentially reconstruct data row by row, the data corresponding to the reference pixel needs to be reconstructed prior to the target data to be reconstructed.

The D_reference buffer 319 may buffer data corresponding to the first row of the encoding data ED. While the data corresponding to the first row of the encoding data ED is being buffered, the D_detector 311 may detect data corresponding to the second row of the encoding data ED. When the D_detector 311 processes the data corresponding to the second row of the encoding data ED, the data corresponding to the first row of the encoding data ED may be loaded from the D_reference buffer 319 to the D_detector 311, and accordingly, respective images of the first and second rows of the encoding data ED may be determined simultaneously. The decoder 310 may buffer image data of the first row without immediately decoding the encoding data ED and simultaneously decode encoding data ED corresponding to the first and second rows when decoding encoding data ED of the second row, and accordingly, power consumed for decoding may be reduced.

Figure 4:
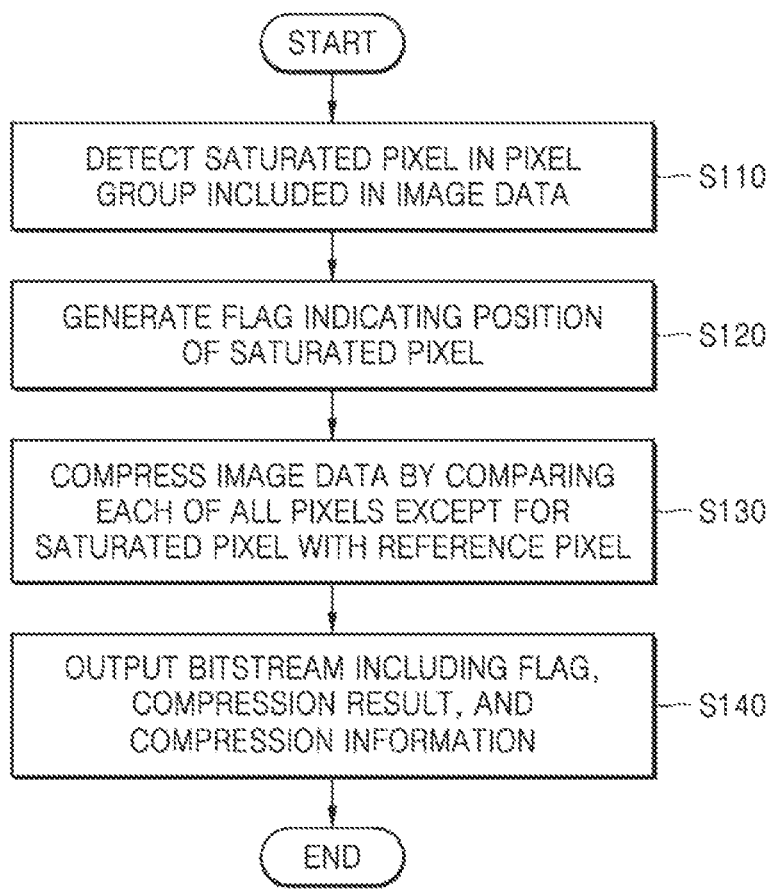
FIG. 4 is a flowchart of an image compression method according to an example embodiment.

FIG. 4 is a flowchart of an image compression method according to an example embodiment. FIG. 1 will also be referred to.

The encoder 210 in FIG. 1 may detect a saturated pixel in a pixel group included in the image data IDTA in operation S110. In an example embodiment, the encoder 210 may detect a saturated pixel, which has a pixel value exceeding a threshold value, in a pixel group of a plurality of pixels, which are adjacent to each other and have the same color as each other. The threshold value may be 95% of the upper limit of the dynamic range of a pixel value, which each of the pixels may have, but is not limited thereto. For example, when ten bits are allocated for a pixel value, the threshold value may be 1000, but is not limited thereto.

The encoder 210 may generate a saturation flag, which indicates the position of the saturated pixel, in operation S120. The encoder 210 may set a position of a saturated pixel to a bit 1's and a position of a non-saturated pixel to a bit 0's or set a position of a saturated pixel to a bit 0's and a position of a non-saturated pixel to a bit 1's. Four bits may be allocated to the saturation flag, but embodiments are not limited thereto.

The encoder 210 may compress the image data IDTA by comparing each of all pixels except for the saturated pixel with a reference pixel in operation S130. The reference pixel may be predetermined. The reference pixel may be compressed prior to a target pixel. The reference pixel may be located before the target pixel. For example, the reference pixel may be located in a row that precedes the target pixel. For example, the reference pixel may be located on the left of the target pixel. For example, the reference pixel may correspond to a pixel value, which has been compressed and reconstructed earlier than the target pixel. However, the position of the reference pixel described above applies to the case where compression is sequentially performed row by row from left to right and may be changed according to a compression order and direction. A differential method may be used as a compression method, but embodiments are not limited thereto. Various compression methods may be used.

A differential method may be used as a compression method. The differential method compresses data by calculating a difference between a pixel value of a reference pixel and a pixel value of a target pixel. The example embodiment assumes that one of a plurality of pixels is selected as the reference pixel, but embodiments are not limited thereto. For example, the reference pixel may refer to a virtual pixel, which has an average pixel value of a plurality of pixels or a median pixel value of respective pixel values of the pixels, where the respective pixel values are sorted in ascending or descending order.

The encoder 210 may output a bitstream, which includes the saturation flag, a compression result, and compression information, in operation S140. According to an example embodiment, the compression information may be included in a header field of the bitstream, the saturation flag may be included in a flag field of the bitstream, and the compression result may be included in a residual field of the bitstream.

According to an example embodiment, the bitstream may be determined to be output or not based on the mode signal MODE. For example, the encoder 210 may output the bitstream, which includes the saturation flag, the compression result, and the compression information indicating a saturation mode, according to the mode signal MODE indicating the saturation mode. For example, the encoder 210 may output a bitstream having a different structure according to the mode signal MODE indicating another compression mode than the saturation mode.

According to an example embodiment, the encoder 210 may detect two or more saturated pixels. When there are at least two saturated pixels, the encoder 210 may output a bitstream corresponding to the saturation mode regardless of the mode signal MODE.

Figure 5A:
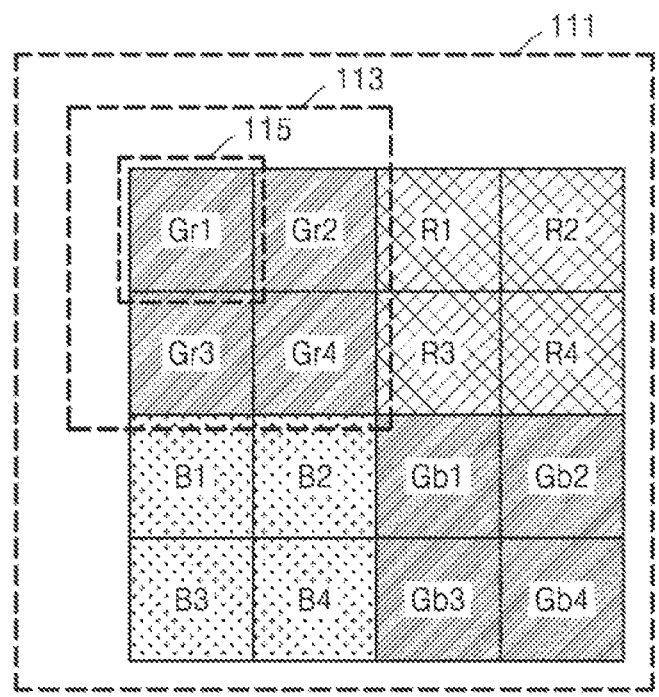
FIGS. 5A and 5B are conceptual diagrams illustrating the structures of pixels according to example embodiments.
Figure 5B:
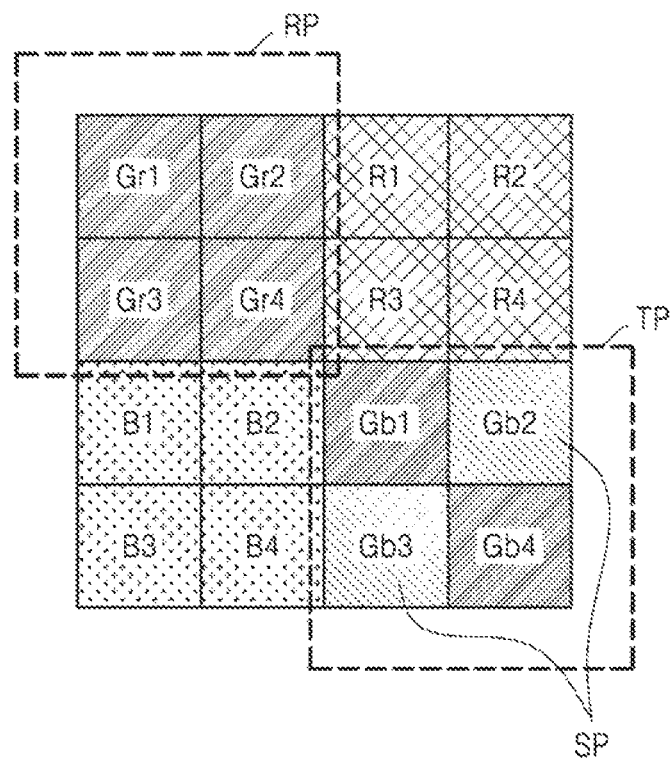

FIGS. 5A and 5B are conceptual diagrams illustrating the structures of pixels, according to example embodiments. FIG. 1 will also be referred to.

Referring to FIG. 5A, the image data IDTA generated by the image sensor 100 in FIG. 1 may correspond to pixel information of an object in a Bayer pattern. Image data in a Bayer pattern may be referred to as a Bayer image.

The image data IDTA may include a Bayer pixel 111. The Bayer pixel 111 may include a group of pixels including all red, green, and blue color information. The Bayer pixel 111 may include pixels arranged in a Bayer pattern. The Bayer pixel 111 may be a basic unit, in which color information of a portion of an object is displayed.

The Bayer pixel 111 may include a pixel group 113. In an example embodiment, the Bayer pixel 111 may include one red pixel group, two green pixel groups, and one blue pixel group. The Bayer pixel 111 may include color information of a portion of a sensed object and may correspond to a portion of the pixel array 110 in FIG. 1.

The pixel group 113 may include a plurality of subpixels 115. A plurality of subpixels 115 included in one pixel group 113 are generated by passing through the same color filter and may thus have the same color information as each other.

The subpixels 115 may be arranged in a matrix. Although the subpixels 115 are arranged in a 2×2 matrix in FIG. 5A, embodiments are not limited thereto. The subpixels 115 may be arranged in an M×N matrix such as a 3×3 matrix, where M and N are natural numbers.

In an example embodiment, a green pixel group may include four green subpixels Gr1, Gr2, Gr3, and Gr4. Similarly, in an example embodiment, a blue pixel group may include four blue subpixels B1, B2, B3, and B4, and a red pixel group may include four red subpixels R1, R2, R3, and R4. As the Bayer pixel 111 conforms to the Bayer pattern, the Bayer pixel 111 may include two green pixel groups. Accordingly, another green pixel group may include four green subpixels Gb1, Gb2, Gb3, and Gb4 different from the green subpixels Gr1, Gr2, Gr3, and Gr4.

Two green pixels included in the Bayer pixel 111 have the same color information as each other but are physically arranged to process different characteristics and may thus be substantially differentiated. In an example embodiment, the green subpixels Gr1 through Gr4 in the first and second rows of the Bayer pixel 111 may be related to a characteristic of a red pixel, and the green subpixels Gb1 through Gb4 in the third and fourth rows of the Bayer pixel 111 may be related to a characteristic of a blue pixel.

As a plurality of subpixels 115 generate subpixel signals of the same color, the electronic device 10 of FIG. 1 may sufficiently generate an electrical signal corresponding to a result of sensing light even in a low light level by adding up the subpixel signals.

Referring to FIG. 5B, the green subpixels Gr1 through Gr4 in the first and second rows of the Bayer pixel 111 may correspond to a reference pixel RP, and the green subpixels Gb1 through Gb4 in the third and fourth rows of the Bayer pixel 111 may correspond to a target pixel TP to be compressed.

In an example embodiment, the position of the reference pixel RP may be predetermined. The position of the reference pixel RP predetermined in the encoder 210 in FIG. 1 may be the same as the position of the reference pixel RP predetermined in the decoder 310 in FIG. 1. The decoder 310 may reconstruct the target pixel TP, referring to data corresponding to the position of the reference pixel RP.

The reference pixel RP may be compressed prior to the target pixel TP, and the position of the reference pixel RP may logically and temporally precede the position of the target pixel TP. For example, the reference pixel RP may be located on the left of the target pixel TP. For example, the reference pixel RP may correspond to a pixel value, which has been compressed and reconstructed prior to the target pixel TP. For example, the reference pixel RP may be located in a row that precedes the target pixel TP. However, the position of the reference pixel described above applies to the case where compression is sequentially performed row by row from left to right and may be changed according to a compression order and direction, and embodiments are not limited thereto.

Although it is assumed that one of a plurality of pixels, for example the pixel group 113 (FIG. 5A) is selected as the reference pixel RP in FIG. 5B, embodiments are not limited thereto. For example, the reference pixel RP may be a virtual pixel having an average pixel value of subpixels forming a pixel group. For example, the reference pixel RP may be a virtual pixel, which has a median pixel value of respective pixel values of subpixels forming a pixel group, wherein the respective pixel values are sorted in ascending or descending order.

According to an example embodiment, the target pixel TP may include the saturated pixel SP. The saturated pixel SP has a pixel value, which exceeds a threshold value in a dynamic range corresponding to a data size that each subpixel may have. For example, each of the subpixels Gb2 and Gb3 of the target pixel TP may have a pixel value that exceeds the threshold value.

According to an example embodiment, each of the respective pixel values of the subpixels Gb2 and Gb3 may be compressed based on a result of comparing each of the respective pixel values of the subpixels Gb2 and Gb3 with a pixel value of the reference pixel RP. For example, the encoder 210 may calculate a difference value between the pixel value of the subpixel Gb2 and the pixel value of the reference pixel RP and a difference value between the pixel value of the subpixel Gb3 and the pixel value of the reference pixel RP, and may output a bitstream as a result of compressing the difference values.

Figure 6:
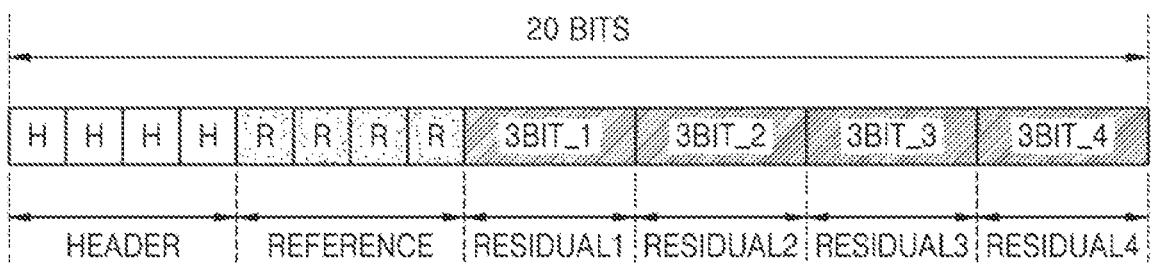
FIG. 6 is a conceptual diagram illustrating the structure of a bitstream in differential pulse code modulation (DPCM)

FIG. 6 is a conceptual diagram illustrating the structure of a bitstream in DPCM. FIG. 6 may show the bitstream involved in the compression method of FIG. 4. It is assumed in FIG. 6 that the bitstream is a result of compressing four pixels each expressing data in ten bits.

Referring to FIGS. 1, 4, and 6, the bitstream includes a header field, a reference field, and a residual field. According to an example embodiment, four bits may be allocated for the header field to express header information H. The header information H refers to an encoded bit set that indicates a compression method, for example, information about a compression algorithm such as DPCM or PCM. As a result of allocating four bits to the header information H, $2^4$ (=16) pieces of compression information may be transmitted via the header information. According to an example embodiment, the decoder 310 may refer to the header information H for a method of compressing subpixels and decode the bitstream using the same method.

According to an example embodiment, the encoder 210 in FIG. 1 may set a pixel group or a subpixel at a predetermined position as the reference pixel RP. The reference pixel RP may refer to a pixel value of a corresponding pixel, an average pixel value of subpixels forming a pixel group, or a median pixel value of the pixel values of the subpixels. The reference pixel RP may be a comparison reference for data compression.

According to an example embodiment, four bits may be allocated to the reference pixel RP. Because four bits are allocated to a data space for the reference pixel RP while the reference pixel RP may have a 10-bit pixel value, the data space R may be insufficient. Therefore, the encoder 210 may remove part of the data of the reference pixel RP. According to an example embodiment, the encoder 210 may remove lower six bits from ten bits of the reference pixel RP and include only upper four bits of the reference pixel RP in the reference field of the bitstream. An arbitrary number of lower bits may be removed from the bits of the reference pixel RP according to the required performance, for example, compression rate, data loss rate, or power consumption, of the encoder 210.

According to an example embodiment, three bits may be allocated to a single residual field RESIDUAL1-4. A pixel group, for example, the pixel group 113 in FIG. 5A may include four subpixels, for example, subpixels 115 in FIG. 5A, and a total of twelve bits 3BIT_1, 3BIT_2, 3BIT_3, and 3BIT_4 may be allocated to a space for a total of four subpixels 115 in the bitstream that transmits the data of the pixel group 113. Data included in a residual field may correspond to a difference value between the pixel value of the reference pixel RP and the pixel value of the target pixel TP.

As a result, a total of 40 bits of data of the four subpixels 115 may be compressed into 16 bits. When four bits allocated to the header including compression information is added to the 16 bits, 40 bits of data may be compressed into 20 bits, and a compression rate of 50% may be achieved. However, embodiments are not limited thereto. The compressed data may have various sizes such as 10 bits (corresponding to a compression rate of 75%) and 30 bits (corresponding to a compression rate of 25%) according to required performance, for example, a compression rate, a data loss rate, or power consumption.

Figure 7:
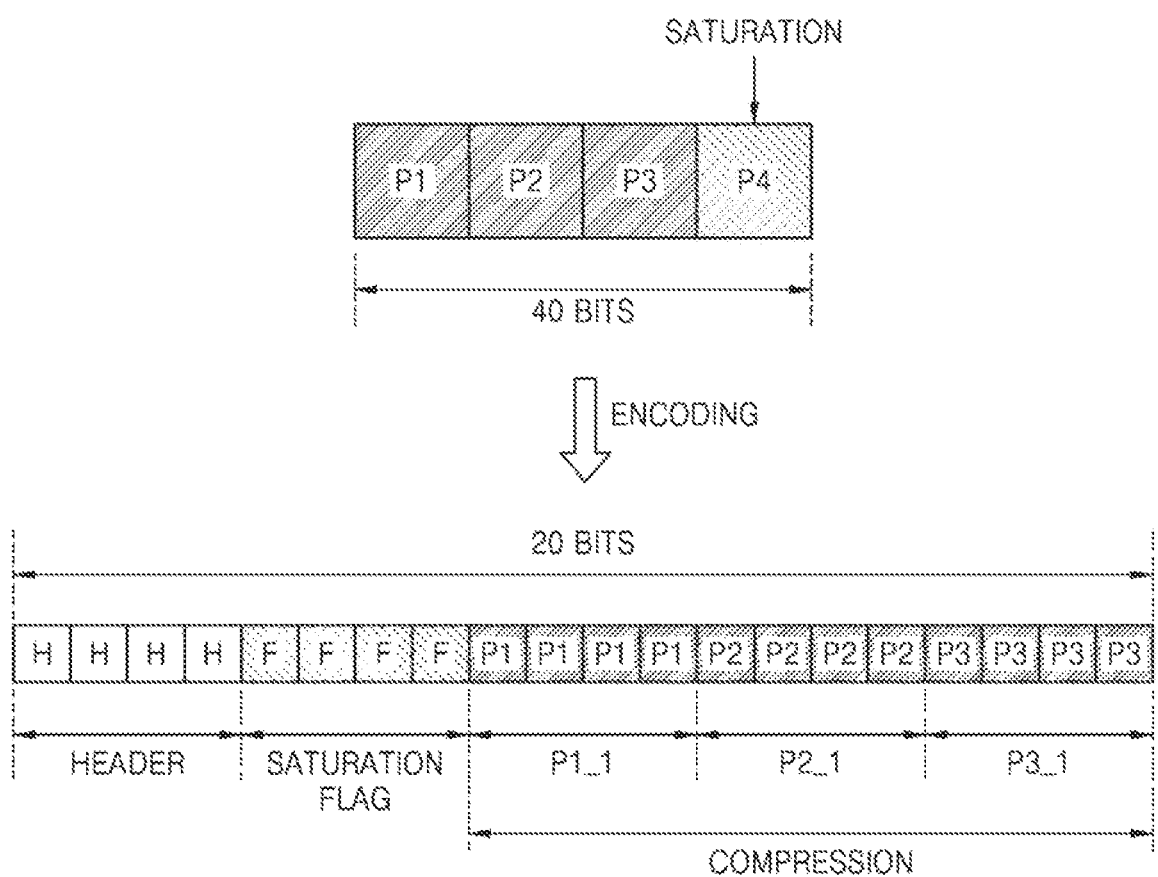
FIGS. 7, 8, and 9 are conceptual diagrams illustrating the structures of bitstreams having different bit allocation according to the numbers of saturated pixels according to an example embodiment.
Figure 8:
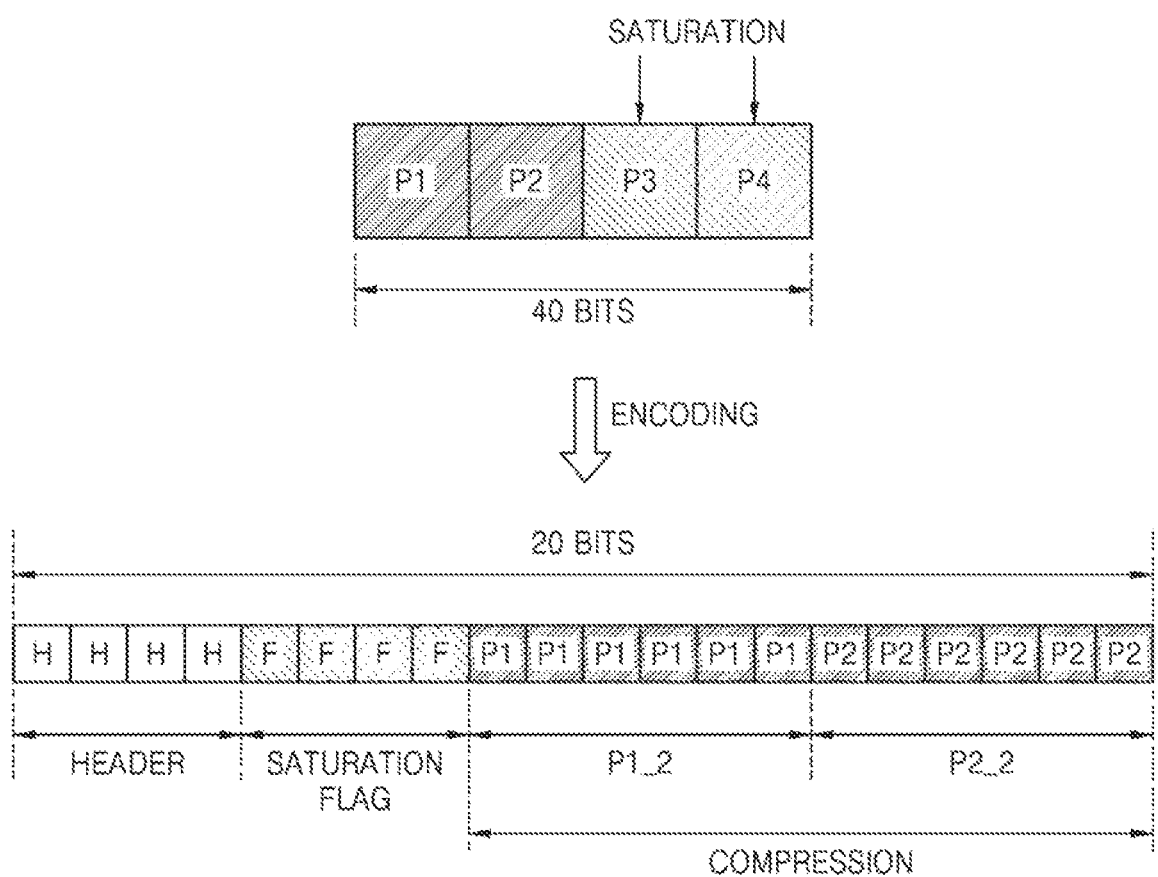
Figure 9:
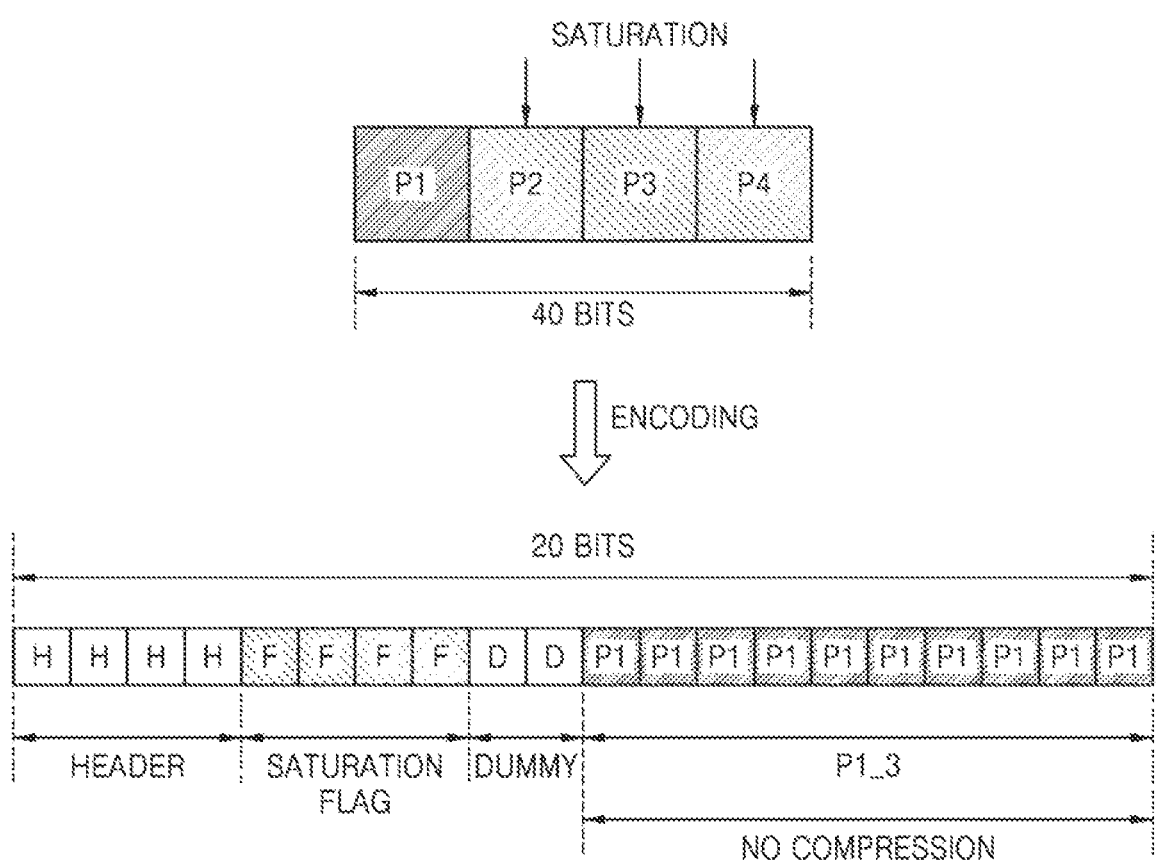

FIGS. 7 through 9 are conceptual diagrams illustrating the structures of bitstreams having different bit allocation according to the numbers of saturated pixels SP, according to an example embodiment. It is assumed in FIGS. 7 through 9 that a bitstream results from compression of four pixels, each of which expresses data in ten bits. Each of pixels, for example, first through fourth pixels P1, P2, P3, and P4, may refer to a subpixel or an average pixel value or a median pixel value of a pixel group.

Referring to FIGS. 1, 5B, and 7, the encoder 210 in FIG. 1 may encode the first through fourth pixels P1, P2, P3, and P4. The encoder 210 may aim at a compression rate of 50%, and the total amount of data of a bitstream to be achieved as a result of compression may be 20 bits.

The encoder 210 may determine the fourth pixel P4 as a saturated pixel SP in FIG. 1. The saturated pixel SP has a pixel value that exceeds a threshold value because of excessive light reception.

The encoder 210 may compare the target pixel TP in FIG. 5B with the reference pixel RP in FIG. 5B and compress the image data IDTA in FIG. 1. According to an example embodiment, the encoder 210 may compare the reference pixel RP with each of non-saturated pixels, for example, the first through third pixels P1, P2, and P3, excluding the saturated pixel SP, for example, the fourth pixel P4, in the pixel group. For example, the encoder 210 may calculate a difference value between the pixel value of each of the non-saturated pixels, for example, the first through third pixels P1, P2, and P3, and the pixel value of the reference pixel RP.

The encoder 210 may include a compression method in a header, to which four bits are allocated. For example, the header may be expressed as bits 0111.

The encoder 210 may include a position of the saturated pixel SP, for example, the fourth pixel P4, in a saturation flag field, to which four bits are allocated. For example, because only the fourth pixel P4 is the saturated pixel SP, a saturation flag may be expressed as bits 0001.

The encoder 210 may include a compression result, for example, the difference value, in a residual space, to which four bits are allocated. For example, a result of compressing the first pixel P1 may be included in a 4-bit residual space P1_1, a result of compressing the second pixel P2 may be included in a 4-bit residual space P2_1, and a result of compressing the third pixel P3 may be included in a 4-bit residual space P3_1.

According to an example embodiment, the encoder 210 may not compare the saturated pixel SP, for example, the fourth pixel P4, with the reference pixel RP and may include a result of compressing each of only non-saturated pixels, for example, the first through third pixels P1, P2, and P3, in the pixel group 113 in a residual field. Accordingly, as compared to the case where data of four pixels is included in a residual field in FIG. 6, the encoder 210 may increase the amount of data expressing a non-saturated pixel, for example, the first, second, or third pixel P1, P2, or P3, from three bits to four bits, which indicates an increase in a dynamic range. Accordingly, degradation of image quality caused by data loss occurring during compression may be reduced. In addition, as compared to a compression method having the same compression rate, an image having a higher resolution may be obtained.

Referring to FIGS. 1, 5B, and 8, the encoder 210 may encode the first through fourth pixels P1, P2, P3, and P4. As described above with reference to FIG. 7, the encoder 210 may aim at a compression rate of 50%, and the total amount of data of a bitstream to be achieved as a result of compression may be 20 bits. Redundant descriptions given with reference to FIG. 7 will be omitted.

The encoder 210 may determine the third and fourth pixels P3 and P4 as saturated pixels SP. The encoder 210 may compare the target pixel TP with the reference pixel RP and compress the image data IDTA.

According to an example embodiment, the encoder 210 may compare the reference pixel RP with each of non-saturated pixels, for example, the first and second pixels P1 and P2, excluding the saturated pixels SP, for example, the third and fourth pixels P3 and P4, in the pixel group. For example, the encoder 210 may calculate a difference value between the pixel value of each of the non-saturated pixels, for example, the first and second pixels P1 and P2, and the pixel value of the reference pixel RP.

The encoder 210 may include a position of each of the saturated pixels SP, for example, the third and fourth pixels P3 and P4, in a saturation flag field, to which four bits are allocated. For example, because the third and fourth pixels P3 and P4 are the saturated pixels SP, a saturation flag may be expressed as bits 0011.

The encoder 210 may include a compression result, for example, the difference value, in a residual space, to which six bits are allocated. For example, a result of compressing the first pixel P1 may be included in a 6-bit residual space P1_2, and a result of compressing the second pixel P2 may be included in a 6-bit residual space P2_2.

According to an example embodiment, the encoder 210 may not compare the saturated pixels SP, for example, the third and fourth pixels P3 and P4, with the reference pixel RP and may include a result of compressing each of only non-saturated pixels, for example, the first and second pixels P1 and P2, in the pixel group 113 in a residual field. Accordingly, as compared to the case where data of three pixels is included in a residual field in FIG. 7, the encoder 210 may increase the amount of data expressing a non-saturated pixel, for example, the first or second pixel P1 or P2, from four bits to six bits, which indicates an increase in a dynamic range. Accordingly, degradation of image quality caused by data loss occurring during compression may be reduced. In addition, as compared to a compression method having the same compression rate, an image having a higher resolution may be obtained.

According to an example embodiment, the more the saturated pixels SP are detected, the compression rate may be increased, and degradation of image quality may be decreased.

Referring to FIGS. 1, 5B, and 9, the encoder 210 may encode the first through fourth pixels P1, P2, P3, and P4. As described above with reference to FIG. 7, the encoder 210 may aim at a compression rate of 50%, and the total amount of data of a bitstream to be achieved as a result of compression may be 20 bits. Redundant descriptions given with reference to FIG. 7 will be omitted.

The encoder 210 may determine the second, third, and fourth pixels P2, P3, and P4 as saturated pixels SP. The encoder 210 may compare the target pixel TP with the reference pixel RP and compress the image data IDTA.

According to an example embodiment, the encoder 210 may compare the reference pixel RP with a non-saturated pixel, for example, the first pixel P1, excluding the saturated pixels SP, for example, the second, third, and fourth pixels P2, P3, and P4, in the pixel group. For example, the encoder 210 may calculate a difference value between the pixel value of the non-saturated pixel, for example, the first pixel P1, and the pixel value of the reference pixel RP.

The encoder 210 may include a position of each of the saturated pixels SP, for example, the second, third, and fourth pixels P2, P3, and P4, in a saturation flag field, to which four bits are allocated. For example, because second, third, and fourth pixels P2, P3, and P4 are the saturated pixels SP, a saturation flag may be expressed as bits 0011.

The encoder 210 may include a compression result, (for example, the difference value, in a residual space, to which twelve bits are allocated. For example, a result of compressing the first pixel P1 may be included in a 10-bit residual space P1_3 of the 12-bit residual space. A data field that may store two more bits is a dummy field that is not used for compression.

According to an example embodiment, the encoder 210 may not compare the saturated pixels SP, for example, the second, third, and fourth pixels P2, P3, and P4, with the reference pixel RP and may include a result of compressing only non-saturated pixel, for example, the first pixel P1, in the pixel group 113 in a residual field. Accordingly, as compared to the case where data of two pixels is included in a residual field in FIG. 8, the encoder 210 may increase the amount of data expressing a non-saturated pixel, for example, the first pixel P1, from six bits to twelve bits, which indicates an increase in a dynamic range. Accordingly, lossless compression having no data loss during compression may be achieved. According to an example embodiment, the more the saturated pixels SP are detected, the compression rate may be increased, and degradation of image quality may be decreased.

Figure 10:
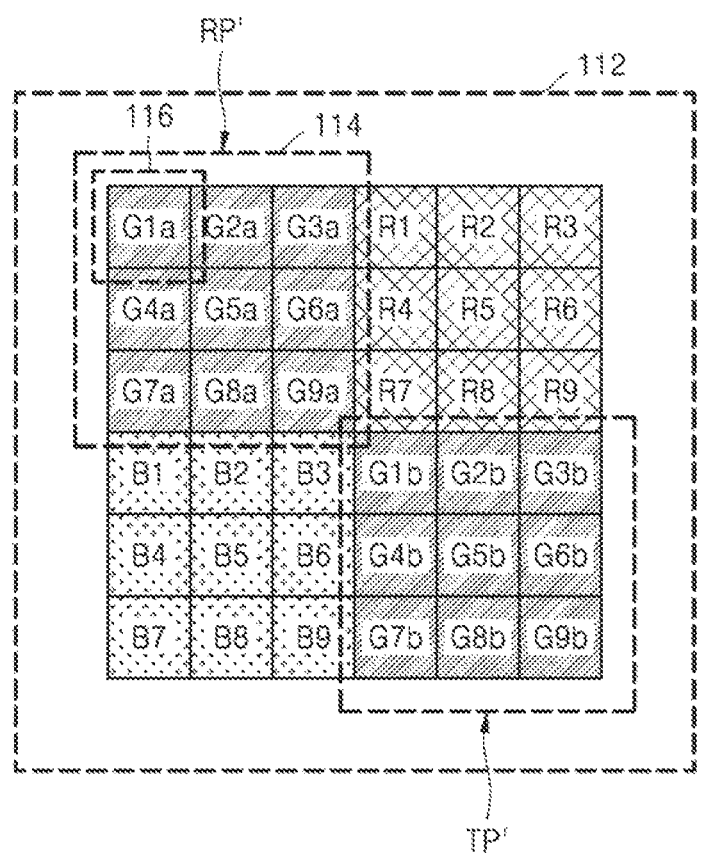
FIG. 10 is a conceptual diagram illustrating the structure of pixels according to an example embodiment.

FIG. 10 is a conceptual diagram illustrating the structure of pixels according to an example embodiment.

Referring to FIG. 10, the image data IDTA in FIG. 1 may include a Bayer pixel 112, which is a group of pixels including all red, green, and blue color information. The Bayer pixel 112 may be a basic unit, in which color information of a portion of an object is displayed.

The Bayer pixel 112 may include a pixel group 114. In an example embodiment, the Bayer pixel 112 may include one red pixel group, two green pixel groups, and one blue pixel group. The Bayer pixel 112 may include color information of a portion of a sensed object and may correspond to a portion of the pixel array 110 in FIG. 1.

The pixel group 114 may include a plurality of subpixels 116. A plurality of subpixels 116 included in one pixel group 114 are generated by passing through the same color filter and may thus have the same color information as each other.

The subpixels 116 may be arranged in a matrix. Unlike the subpixels 115 in FIG. 5A, the subpixels 116 are arranged in a 3×3 matrix in FIG. 10, but embodiments are not limited thereto. It will be understood that the subpixels 116 may be arranged in an M×N matrix, where M and N are natural numbers.

In an example embodiment, a green pixel group may include nine green subpixels Gr1, Gr2, Gr3, Gr4, Gr5, Gr6, Gr7, Gr8, and Gr9. Similarly, in an example embodiment, a blue pixel group may include nine blue subpixels B1, B2, B3, B4, B5, B6, B7, B8, and B9, and a red pixel group may include nine red subpixels R1, R2, R3, R4, R5, R6, R7, R8, and R9. As the Bayer pixel 112 conforms to the Bayer pattern, the Bayer pixel 112 may include two green pixel groups. Accordingly, the other green pixel group may include nine green subpixels Gb1, Gb2, Gb3, Gb4, Gb5, Gb6, Gb7, Gb8, and Gb9 different from the green subpixels Gr1, Gr2, Gr3, Gr4, Gr5, Gr6, Gr7, Gr8, and Gr9.

Hereinafter, it is assumed that a first green pixel group including the green subpixels Gr1, Gr2, Gr3, Gr4, Gr5, Gr6, Gr7, Gr8, and Gr9 is a reference pixel RP', and a second green pixel group including the green subpixels Gb1, Gb2, Gb3, Gb4, Gb5, Gb6, Gb7, Gb8, and Gb9 is a target pixel TP'.

Figure 11:
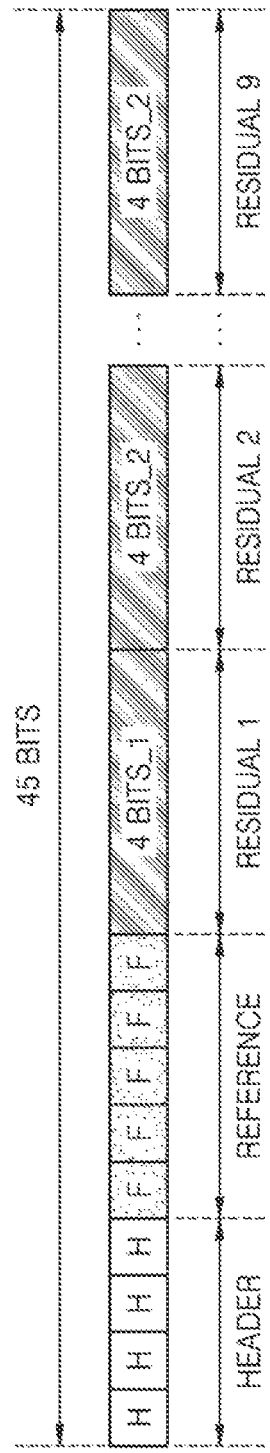
FIG. 11 is a conceptual diagram illustrating the structure of a bitstream in DPCM.

FIG. 11 is a conceptual diagram illustrating the structure of a bitstream in DPCM. FIG. 11 is provided to describe a bitstream corresponding to the pixel structure of FIG. 10. It is assumed in FIG. 11 that the bitstream is a result of compressing nine pixels each expressing data in ten bits. For example, it is assumed that a single subpixel includes 10-bit data, but embodiments are not limited thereto. A single subpixel may include a different number of bits of data such as 8-bit data, 11-bit data, or 12-bit data.

The encoder 210 may allocate data space of a bitstream such that 90-bit data of nine pixels is compressed into 45-bit data. When 90-bit data is compressed into 45-bit data, a compression rate is 50%.

Referring to FIGS. 1, 10, and 11, the bitstream includes a header field, a reference field, and a residual field.

According to an example embodiment, four bits may be allocated to a header. As described above, header information refers to an encoded bit set that indicates a compression method, for example, information about a compression algorithm such as DPCM or PCM, and, as a result of allocating four bits to the header information, $2^4$ (=16) pieces of compression information may be transmitted via the header information.

A virtual pixel based on a pixel value of one of a plurality of subpixels of the pixel group 114 or based on pixel values of the subpixels may be determined as a reference pixel. For example, the encoder 210 may determine a subpixel 116, which has an average pixel value or a median pixel value, or a subpixel 116, which is predetermined among a plurality of subpixels 116, as the reference pixel RP' in FIG. 10.

According to an example embodiment, five bits may be allocated to the reference field for the reference pixel RP'. Because five bits are allocated to a data space for the reference pixel RP' while the reference pixel RP' may have a 10-bit pixel value, the data space may be insufficient. Therefore, the encoder 210 may remove part of the data of the reference pixel RP'. According to an example embodiment, the encoder 210 may remove lower five bits from ten bits of the reference pixel RP' and include only upper five bits of the reference pixel RP' in the bitstream. As described above, data removed from a subpixel is not limited thereto.

According to an example embodiment, a result of compressing the target pixel TP' in FIG. 10 to be compressed among a plurality of pixel groups 114 may be included in the residual field. The target pixel TP' may include nine green subpixels Gb1, Gb2, Gb3, Gb4, Gb5, Gb6, Gb7, Gb8, and Gb9. The bitstream may be 45 bits in length. When four bits are allocated to the header and five bits are allocated for the reference pixel RP' in the bitstream, 36 bits may be allocated to the residual field.

According to an example embodiment, because the target pixel TP' includes nine green subpixels Gb1, Gb2, Gb3, Gb4, Gb5, Gb6, Gb7, Gb8, and Gb9, four bits 4BIT_1, 4BIT_2, ..., or 4BIT_9 may be allocated for each of the nine green subpixels Gb1, Gb2, Gb3, Gb4, Gb5, Gb6, Gb7, Gb8, and Gb9. For example, a result of compressing the green subpixel Gb1 may be included in a first residual field RESIDUAL1, a result of compressing the green subpixel Gb2 may be included in a second residual field RESIDUAL2, and a result of compressing the green subpixel Gb9 may be included in a ninth residual field RESIDUAL9.

Consequently, a total 90 bits of data of nine subpixels 116 may be compressed into 41 bits. When four bits allocated to the header including the compression information are added to 41 bits, 90 bits may be compressed into 45 bits, and a compression rate of 45% may be achieved. Although it is assumed that the size of compressed data is 45 bits, embodiments are not limited thereto. The compressed data may have various sizes according to required performance, for example, a compression rate, a data loss rate, or power consumption.

Figure 12:
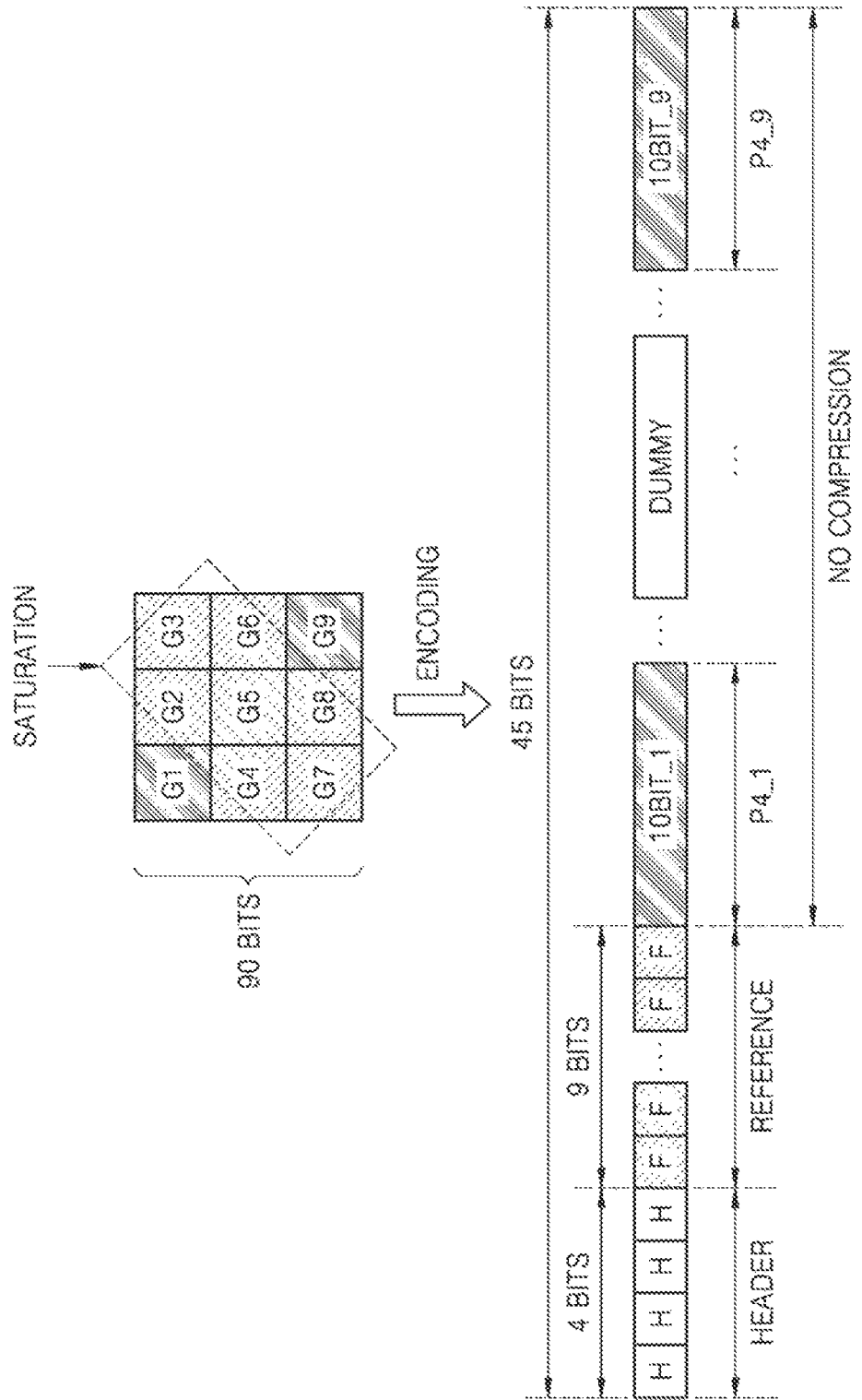
FIG. 12 is a conceptual diagram illustrating the structure of a bitstream generated according to the occurrence of a saturated pixel according to an example embodiment.

FIG. 12 is a conceptual diagram illustrating the structure of a bitstream generated according to the occurrence of a saturated pixel, according to an example embodiment.

Referring to FIGS. 10 through 12, the encoder 210 in FIG. 1 may encode first through ninth pixels G1 through G9. The encoder 210 may aim at a compression rate of 50%, and the total amount of data of a bitstream to be achieved as a result of compression may be 45 bits.

The encoder 210 may determine the second through eighth pixels G2 through G8 as saturated pixels SP in FIG. 1. A saturated pixel SP has a pixel value that exceeds a threshold value because of excessive light reception.

The encoder 210 may compare the target pixel TP' in FIG. 10 with the reference pixel RP' in FIG. 10 and compress the image data IDTA in FIG. 1. According to an example embodiment, the encoder 210 may compare the reference pixel RP' with each of non-saturated pixels, for example, the second through eighth pixels G2 through G8, excluding the saturated pixels SP, for example, the first and ninth pixels G1 and G9, in a pixel group. For example, the encoder 210 may calculate a difference value between the pixel value of each of the non-saturated pixels, for example, the first and ninth pixels G1 and G9, and the pixel value of the reference pixel RP'.

The encoder 210 may include a compression method in a header, to which four bits are allocated. For example, the header may be expressed as bits 0111.

The encoder 210 may include a position of each of the saturated pixels SP, for example, the second through eighth pixels G2 through G8, in a saturation flag field, to which nine bits are allocated. For example, a saturation flag may be expressed as bits 011111110.

The encoder 210 may include a compression result, for example, the difference value, in a residual space, to which 32 bits are allocated. For example, a result of compressing the first pixel G1 may be included in a 10-bit residual space P4_1, and a result of compressing the ninth pixel G9 may be included in a 10-bit residual space P4_9. A data field that may store twelve more bits is a dummy field that is not used for compression.

According to an example embodiment, the encoder 210 may not compare the saturated pixels SP, for example, the second through eighth pixels G2 through G8, with the reference pixel RP' and may include a result of compressing each of only non-saturated pixels, for example, the first and ninth pixels G1 and G9, in the pixel group 114 in a residual field. Accordingly, as compared to the case where data of nine pixels is included in the residual field in FIG. 11, the encoder 210 may increase the amount of data expressing a non-saturated pixel, for example, the first or ninth pixel G1 or G9, from four bits to ten bits, which indicates an increase in a dynamic range. Accordingly, lossless compression having no data loss during compression may be achieved. According to an example embodiment, the more the saturated pixels SP are detected, the compression rate may be increased, and degradation of image quality may be decreased.

FIGS. 13A and 13B are tables of compression information according to example embodiments. FIGS. 13A and 13B are provided to describe compression modes or compression methods according to the standard suggested by MIPI Alliance. FIG. 1 will also be referred to.

Referring to FIG. 13A, the image data IDTA (FIG. 1) in a Bayer pattern may be compressed according to various compression modes. The compression modes may include a pixel-based directional differential (PD) mode, a diagonal direction-based differential (DGD) mode, an extended slanted horizontal or vertical direction-based differential (eSHV) mode, an outlier compensation (OUT) mode, and a fixed quantization and no-reference (FNR) mode.

The PD mode may allow DPCM to be performed on the image data IDTA having a Bayer pattern. The PD mode may be classified into MODE0, MODE1, MODE2, MODE3, MODE12, and MODE13 according to specific realization algorithms. Because four bits may be allocated to a header indicating a compression method, sixteen compression modes may be differently expressed as bits as header information. For example, MODE0 may be expressed as bits 0000, MODE1 may be expressed as bits 0001, MODE2 may be expressed as bits 0010, MODE3 may be expressed as bits 0011, MODE12 may be expressed as bits 1100, and MODE13 may be expressed as bits 1101.

The DGD mode may allow DPCM to be performed on the image data IDTA having a diagonal structure. The DGD mode may be classified into MODE4 (bits 0100), MODE5 (bits 0101), MODE8 (bits 1000), MODES (bits 1001), MODE10 (bits 1010), and MODE11 (bits 1011) according to specific realization algorithms.

Similarly, the eSHV mode may include MODE14 (bits 1110) and MODE15 (bits 1111), the OUT mode may include MODE7 (bits 0111), and the FNR mode may include MODE6 (bits 0110). According to an example embodiment, MODE7 may be referred to as the OUT mode, which includes a bad pixel mode processing a bad pixel, or a saturation mode. According to an operation environment, either the saturation mode or the OUT mode may be selected.

In an example embodiment, the mode selector 230 in FIG. 1 may sequentially evaluate the PD mode, the DGD mode, the eSHV mode, the OUT mode, and the FNR mode and select an optimal mode according to a compression evaluation index such as a compression rate or a data loss rate. However, embodiments are not limited to the mode evaluation order suggested above.

Referring to FIG. 13B, the image data IDTA, in which a pixel group, for example, the pixel group 113 in FIG. 5A of a Bayer pixel, for example, Bayer pixel 111 in FIG. 5A includes a plurality of sub pixels, for example, four subpixels in a 2×2 matrix, may be compressed in various compression modes. The compression modes may include an average-based directional differential (AD) mode, an extended horizontal or vertical direction-based differential (eHVD) mode, an oblique direction-based differential (OD) mode, an extended multi-pixel-based differential (eMPD) mode, an extended horizontal or vertical average-based differential (eHVA) mode, an extended outlier compensation (eOUT) mode, and an FNR mode.

The AD mode may allow DPCM to be performed on the image data IDTA, in which the pixel group 113 forming a Bayer pattern includes a plurality of subpixels. The AD mode may be classified into MODE0, MODE1, MODE2, and MODE3 according to specific realization algorithms. Because four bits may be allocated to a header indicating a compression method, sixteen compression modes may be differently expressed as bits as header information. For example, MODE0 may be expressed as bits 0000, MODE1 may be expressed as bits 0001, MODE2 may be expressed as bits 0010, and MODE3 may be expressed as bits 0011.

The OD mode may allow the image data IDTA, which has a diagonal structure, to be compressed. The OD mode may be classified into MODE4 (bits 0100) and MODES (bits 0101) according to specific realization algorithms.

Similarly, the eMPD mode may include MODE8 (bits 1000), MODES (bits 1001), MODE10 (bits 1010), and MODE11 (bits 1011), the eHVD mode may include MODE12 (bits 1100) and MODE13 (bits 1101), the eHVA mode may include MODE14 (bits 1110), an (e)OUT mode (for example, the eOUT mode or the OUT mode) may include MODE15 (bits 1111) and MODE7 (bits 0111), and the FNR mode may include MODE6 (bits 0110). According to an example embodiment, MODE7 may be referred to as the (e)OUT mode, which includes a bad pixel mode processing a bad pixel, or a saturation mode. According to an operation environment, either the saturation mode or the (e)OUT mode may be selected.

In an example embodiment, the mode selector 230 may sequentially evaluate the AD mode, the eHVD mode, the OD mode, the eMPD mode, the eHVA mode, the eOUT mode, and the FNR mode and select an optimal mode according to a compression evaluation index such as a compression rate or a data loss rate. However, embodiments are not limited to the mode evaluation order suggested above.

Figure 14A:
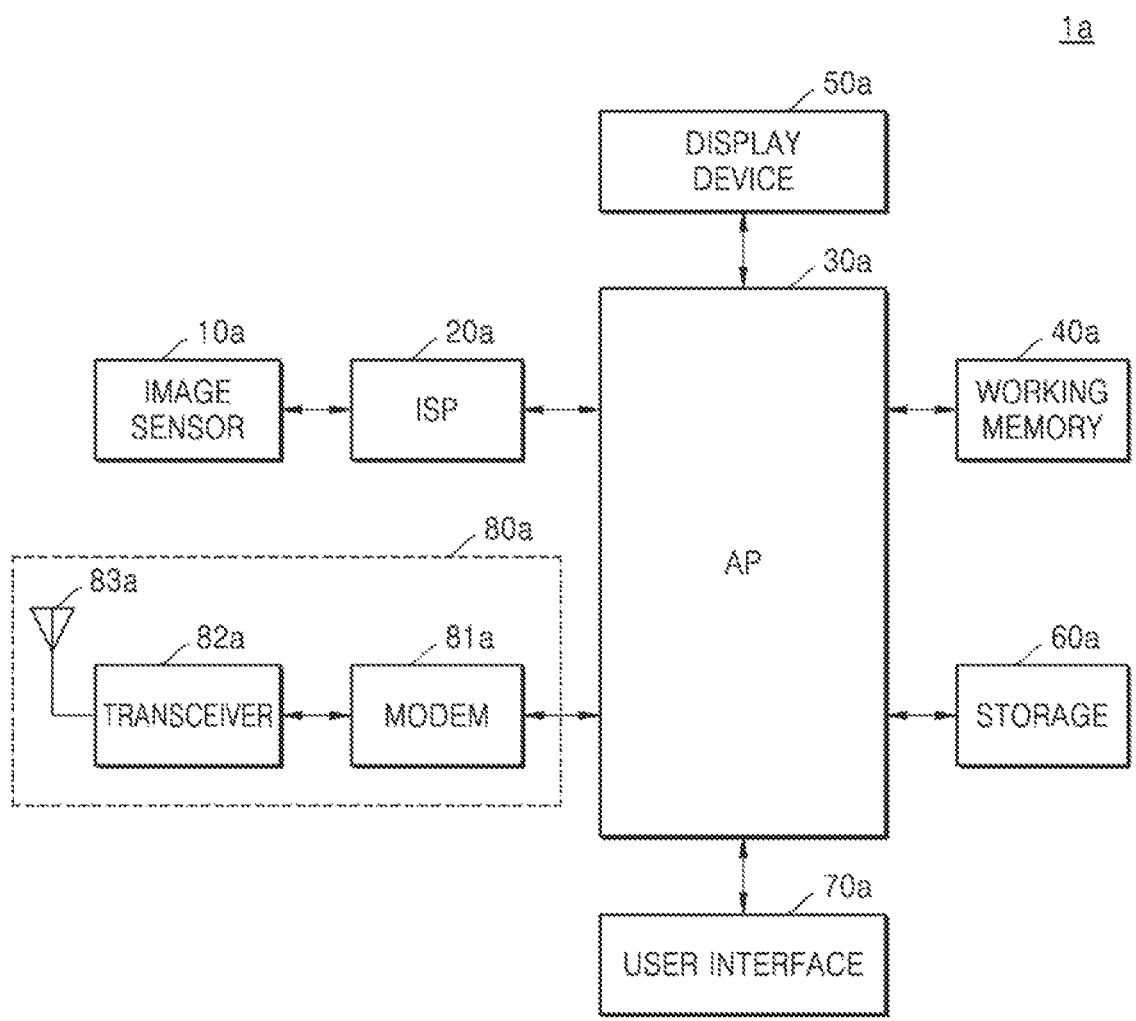
FIGS. 14A and 14B are block diagrams of electronic devices each including an image signal processor according to example embodiments.
Figure 14B:
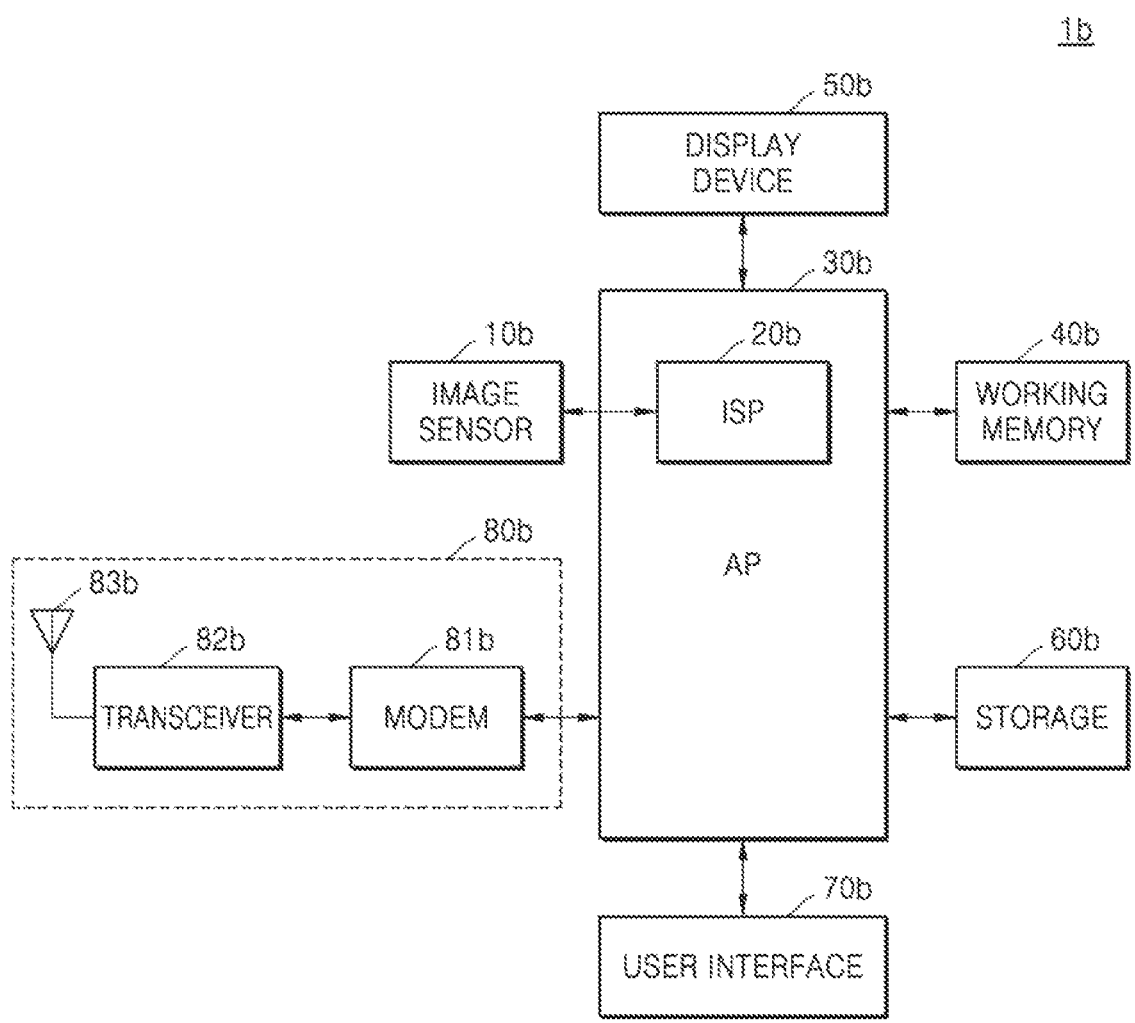

FIGS. 14A and 14B are block diagrams of electronic devices 1a and 1b respectively including an ISP 20a and an ISP 20b, according to example embodiments. The electronic device 10 described with reference to FIG. 1 may be applied to FIGS. 14A and 14B.

Referring to FIG. 14A, the electronic device 1a may include an image sensor 10a, the ISP 20a, a display device 50a, an AP 30a, a working memory 40a, a storage 60a, a user interface 70a, and a wireless transceiver 80a. The ISP 20a may be implemented as a separate integrated circuit from the AP 30a. The image sensor 100 in FIG. 1 may operate as the image sensor 10a in FIG. 14A, and the ISP 200 in FIG. 1 may be used as the ISP 20a in FIG. 14A.

The image sensor 10a may generate image data, for example, raw image data, based on a received optical signal and provide binary data to the ISP 20a. The AP 30a may be provided as a system-on-chip (SoC), which controls all operations of the electronic device 1a and runs an application program, an operating system, or the like. The AP 30a may control the operation of the ISP 20a and may provide converted image data generated by the ISP 20a to the display device 50a or store the converted image data in the storage 60a.

The display device 50a may include any device that may output an image. For example, the display device 50a may include a computer, a mobile phone, and other image output terminals. The display device 50a may be an example of an output device. Other examples of the output device include a graphics display device, a computer screen, an alarm system, a computer aided design/computer aided machining (CAD/CAM) system, a video game station, a smartphone display screen, and other types of data output devices.

The working memory 40a may store programs and/or data, which are processed or executed by the AP 30a. The storage 60a may include non-volatile memory such as NAND flash memory or resistive memory. For example, the storage 60a may be provided as a memory card such as a multimedia card (MMC), an embedded MMC (eMMC), a secure digital (SD) card, or a micro SD card. The storage 60a may store data and/or a program, which is related to an execution algorithm controlling the image processing operation of the ISP 20a. The data and/or the program may be loaded to the working memory 40a when the image processing operation is performed.

The user interface 70a may include various devices, such as a keyboard, a button key panel, a touch panel, a fingerprint sensor, and a microphone, which may receive a user input. The user interface 70a may receive a user input and provide a signal corresponding to the user input to the AP 30*a*. The wireless transceiver 80*a* may include a modem 81*a*, a transceiver 82*a*, and an antenna 83*a*.

Referring to FIG. 14B, the electronic device 1*b* may include an image sensor 10*b*, the ISP 20*b*, a display device 50*b*, an AP 30*b*, a working memory 40*b*, a storage 60*b*, a user interface 70*b*, and a wireless transceiver 80*b*. The image sensor 100 in FIG. 1 may operate as the image sensor 10*b* in FIG. 14B, and the ISP 200 in FIG. 1 may be used as the ISP 20*b* in FIG. 14B.

The AP 30*b* may include the ISP 20*b*. The ISP 20*b* may not be implemented by separate hardware or a combination of hardware and software but be provided as a sub-element of the AP 30*b*. The other elements in FIG. 14B are similar to those in FIG. 14A, and thus redundant descriptions are omitted.

Figure 15:
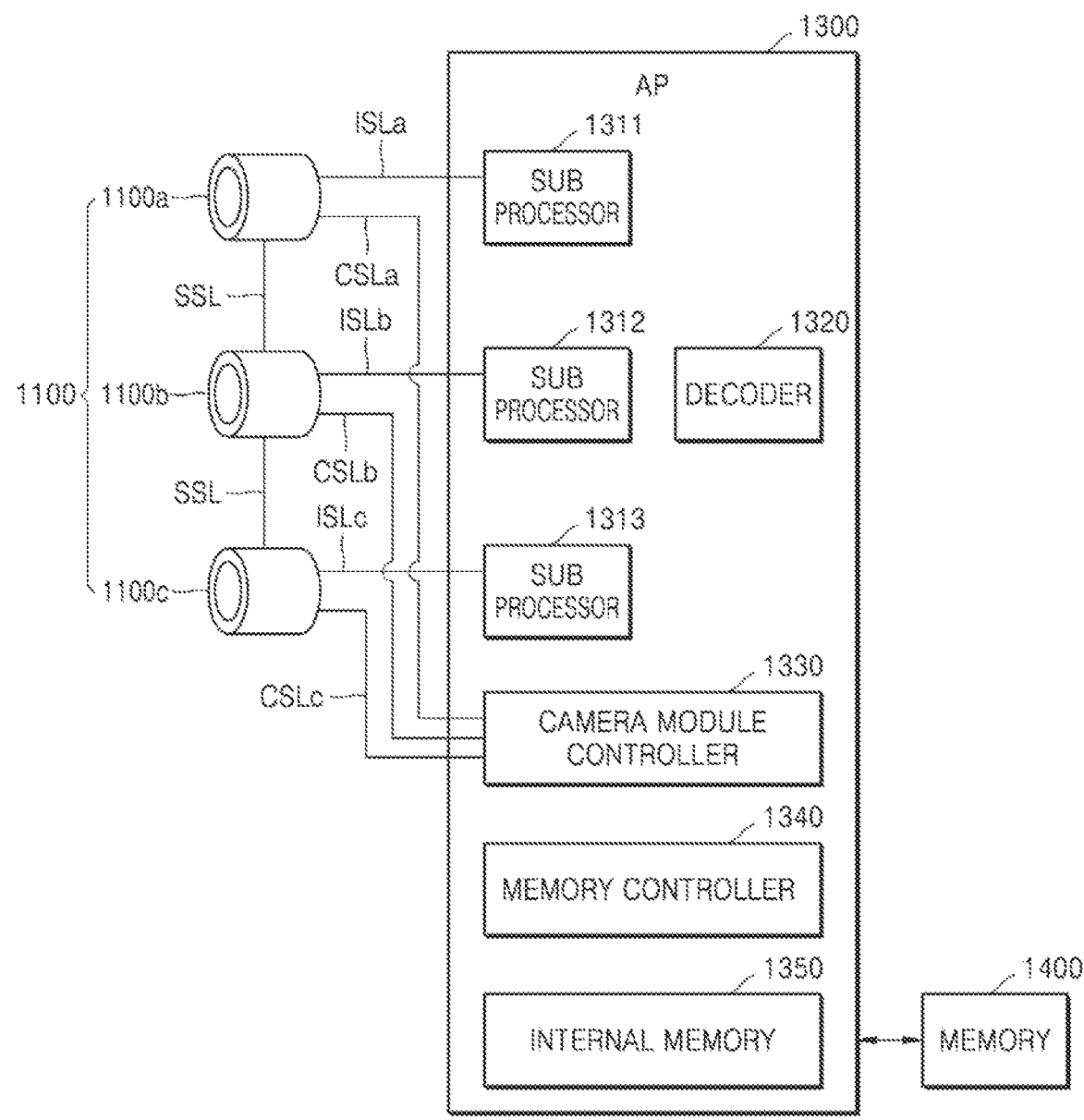
FIG. 15 is a block diagram of an electronic device, according to an example embodiment.
Figure 16:
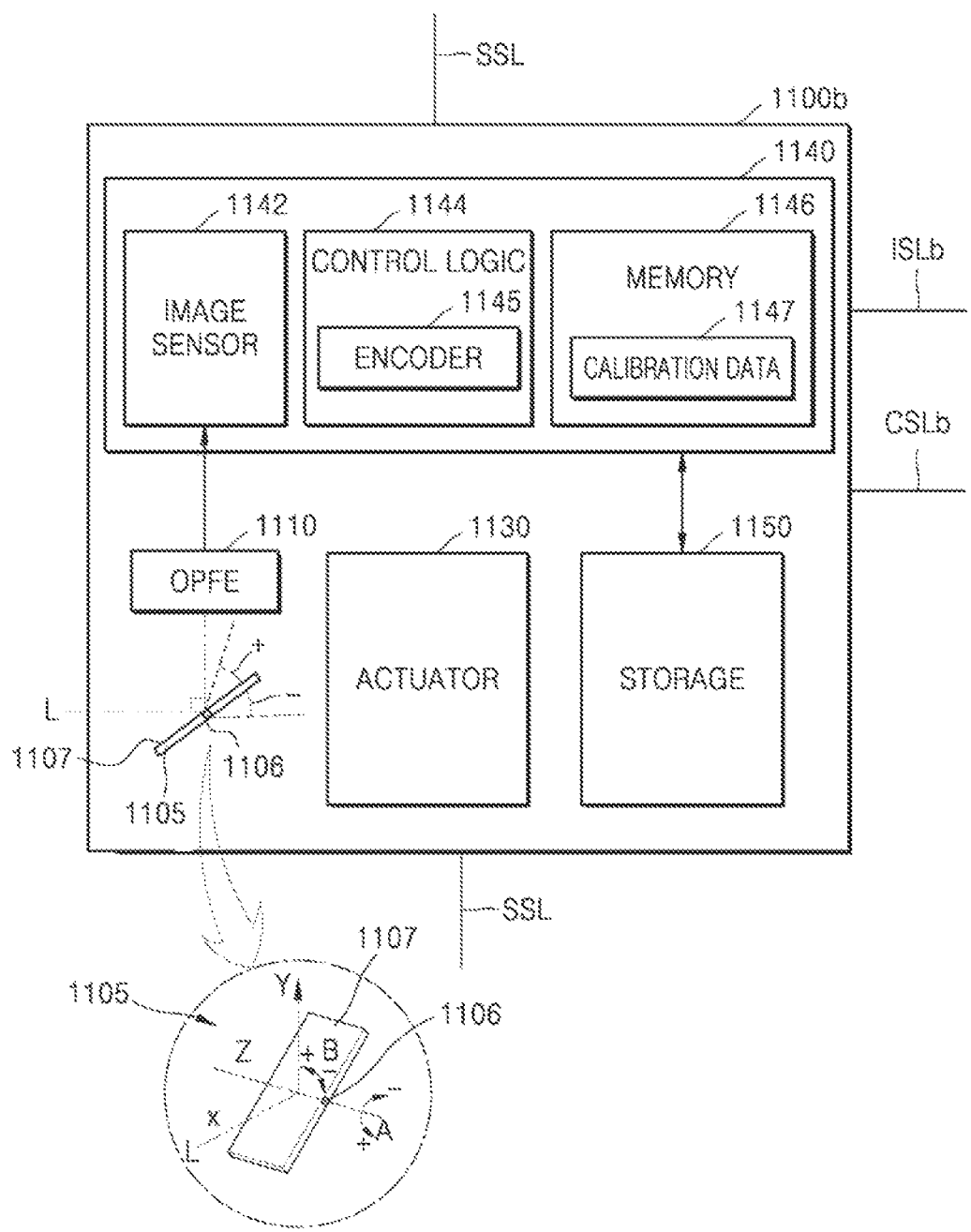
FIG. 16 is a detailed block diagram of a camera module in FIG. 15.

FIG. 15 is a schematic block diagram of an electronic device 20 according to an example embodiment. FIG. 16 is a detailed block diagram of a camera module 1100*b* in FIG. 15.

For example, a portion of the electronic device 1*a* of FIG. 14A or the electronic device 1*b* of FIG. 14B is illustrated as the electronic device 20 in FIG. 15. The elements that are shown in FIG. 14A or 14B but omitted from FIG. 15 may be included in the electronic device 20.

Referring to FIG. 15, the electronic device 20 may include a multi-camera module 1100, an AP 1300, and a memory 1400. The memory 1400 may perform the same function as the working memory 40*a* in FIG. 14A or the working memory 40*b* in FIG. 14B, and thus redundant descriptions will be omitted.

The electronic device 20 may capture and/or store an image of an object using a CMOS image sensor and may include a mobile phone, a table computer, or a portable electronic device. The portable electronic device may include a laptop computer, a mobile phone, a smartphone, a tablet PC, or a wearable device. The electronic device 20 may include at least one camera module and the AP 1300 processing image data generated by the camera module.

The multi-camera module 1100 may include a first camera module 1100*a*, a second camera module 1100*b*, and a third camera module 1100*c*. The multi-camera module 1100 may perform the same function as the camera module 50 in FIG. 1. Although three camera modules, for example, the first through third camera modules 1100*a*, 1100*b*, and 1100*c*, are illustrated, embodiments are not limited thereto. Various numbers of camera modules may be included in the multi-camera module 1100.

The detailed configuration of the second camera module 1100*b* will be described with reference to FIG. 16 below. The descriptions below may also be applied to the other camera modules, for example, the first and third camera modules 1100*a* and 1100*c*.

Referring to FIG. 16, the second camera module 1100*b* may include a prism 1105, an optical path folding element (OPFE) 1110, an actuator 1130, an image sensing device 1140, an encoder 1145, and a storage 1150.

The prism 1105 may include a reflective surface 1107 of a light reflecting material and may change the path of light L incident from outside.

According to an example embodiment, the prism 1105 may change the path of the light L incident in a first direction X into a second direction Y perpendicular to the first direction X. The prism 1105 may rotate the reflective surface 1107 of the light reflecting material in a direction A around a central shaft 1106 or rotate the central shaft 1106 in a direction B so that the path of the light L incident in the first direction X is changed into the second direction Y perpendicular to the first direction X. At this time, the OPFE 1110 may move in a third direction Z, which is perpendicular to the first and second directions X and Y.

In an example embodiment, an A-direction maximum rotation angle of the prism 1105 may be less than or equal to 15 degrees in a plus (+) A direction and greater than 15 degrees in a minus (−) A direction, but embodiments are not limited thereto.

In an example embodiment, the prism 1105 may move by an angle of about 20 degrees or in a range from about 10 degrees to about 20 degrees or from about 15 degrees to about 20 degrees in a plus or minus B direction. At this time, an angle by which the prism 1105 moves in the plus B direction may be the same as or similar, within a difference of about 1 degree, to an angle by which the prism 1105 moves in the minus B direction.

In some example embodiments, the prism 1105 may move the reflective surface 1107 of the light reflecting material in the third direction Z parallel with an extension direction of the central shaft 1106.

The OPFE 1110 may include, for example, "m" optical lenses, where "m" is a natural number. The "m" lenses may move in the second direction Y and change an optical zoom ratio of the second camera module 1100*b*. For example, when the default optical zoom ratio of the second camera module 1100*b* is Z, the optical zoom ratio of the second camera module 1100*b* may be changed to 3Z, 5Z, or greater by moving the "m" optical lenses included in the OPFE 1110.

The actuator 1130 may move the OPFE 1110 or an optical lens to a certain position. Hereinafter, the OPFE 1110 and the optical lens are collectively referred to as the optical lens. For example, the actuator 1130 may adjust the position of the optical lens such that an image sensor 1142 is positioned at a focal length of the optical lens for accurate sensing.

The image sensing device 1140 may include the image sensor 1142, a control logic 1144, the encoder 1145, and a memory 1146. The image sensor 1142 may sense an image of an object using the light L provided through the optical lens. The image sensor 1142 in FIG. 17 is functionally similar to the image sensor 100 in FIG. 1, and thus redundant descriptions will be omitted. The control logic 1144 may generally control operations of the second camera module 1100*b*. For example, the control logic 1144 may control operation of the second camera module 1100*b* according to a control signal provided through a control signal line CSLb.

The encoder 1145 may encode sensed image data. The encoder 1145 may perform the same function as the encoder 210 described with reference to FIGS. 1 through 14B, and thus redundant descriptions will be omitted. Differently from the encoder 210 in FIG. 1, the encoder 1145 in FIG. 16 is not included in the ISP 200 in FIG. 1 but may be included in a camera module, for example, the second camera module 1100*b*. Although the encoder 1145 is illustrated as a functional block, embodiments are not limited thereto. The encoder 1145 may be executed by the control logic 1144 to compress and encode image data.

The memory 1146 may store information, such as calibration data 1147, necessary for the operation of the second camera module 1100*b*. The calibration data 1147 may include information, which is necessary for the second camera module 1100*b* to generate image data using the light L provided from outside. For example, the calibration data 1147 may include information about the degree of rotation described above, information about a focal length, information about an optical axis, or the like. When the second camera module 1100b is implemented as a multi-state camera that has a focal length varying with the position of the optical lens, the calibration data 1147 may include a value of a focal length for each position or state of the optical lens and information about auto focusing.

The storage 1150 may store image data sensed by the image sensor 1142. The storage 1150 may be provided outside the image sensing device 1140 and may form a stack with a sensor chip of the image sensing device 1140. In an example embodiment, the storage 1150 may include electrically erasable programmable read-only memory (EEPROM), but embodiments are not limited thereto.

Referring to FIGS. 15 and 16, in an example embodiment, among a plurality of camera modules, for example, the first through third camera modules 1100a, 1100b, and 1100c, one camera module, for example, the first camera module 1100a, may include a color pixel, for example, a Tetra cell, including four subpixels, which are adjacent to one another and share the same color information with one another, and another camera module, for example, the second camera module 1100b, may include a color pixel, for example, a Nona cell, including nine subpixels, which are adjacent to one another and share the same color information with one another, but embodiments are not limited thereto.

In an example embodiment, each of the first through third camera modules 1100a, 1100b, and 1100c may include the actuator 1130. Accordingly, the first through third camera modules 1100a, 1100b, and 1100c may include the calibration data 1147, which is the same or different among the first through third camera modules 1100a, 1100b, and 1100c according to the operation of the actuator 1130 included in each of the first through third camera modules 1100a, 1100b, and 1100c.

In an example embodiment, among the first through third camera modules 1100a, 1100b, and 1100c, one camera module, for example, the second camera module 1100b, may be of a folded-lens type including the prism 1105 and the OPFE 1110 while the other camera modules, for example, the first and third camera modules 1100a and 1100c, may be of a vertical type that does not include the prism 1105 and the OPFE 1110. However, embodiments are not limited thereto.

In an example embodiment, one camera module, for example, the third camera module 1100c, among the first through third camera modules 1100a, 1100b, and 1100c may include a vertical depth camera, which extracts depth information using an infrared ray (IR). In this case, the AP 1300 may generate a three-dimensional (3D) depth image by merging image data provided from the depth camera with image data provided from another camera module, for example, the first or second camera module 1100a or 1100b.

In an example embodiment, at least two camera modules, for example, the first and second camera modules 1100a and 1100b, among the first through third camera modules 1100a, 1100b, and 1100c may have different field-of-views (FOV). In this case, the two camera modules, for example, the first and second camera modules 1100a and 1100b, among the first through third camera modules 1100a, 1100b, and 1100c may respectively have different optical lenses, but embodiments are not limited thereto. For example, the first camera module 1100a among the first through third camera modules 1100a, 1100b, and 1100c may have a lower FOV than the second and third camera modules 1100b and 1100c. However, embodiments are not limited thereto. The multi-camera module 1100 may further include a camera module having a higher FOV than the first through third camera modules 1100a, 1100b, and 1100c.

In some example embodiments, the first through third camera modules 1100a, 1100b, and 1100c may have different field-of-views from one another. In this case, the first through third camera modules 1100a, 1100b, and 1100c may respectively have different optical lenses, but embodiments are not limited thereto.

In some example embodiments, the first through third camera modules 1100a, 1100b, and 1100c may be physically separated from one another. For example, the sensing area of the image sensor 1142 may not be divided and used by the first through third camera modules 1100a, 1100b, and 1100c, but the image sensor 1142 may be independently included in each of the first through third camera modules 1100a, 1100b, and 1100c.

The AP 1300 may include a plurality of subprocessors, for example, first through third subprocessors 1311, 1312, and 1313, a decoder 1320, a camera module controller 1330, a memory controller 1340, and an internal memory 1350.

The AP 1300 may be separately implemented from the first through third camera modules 1100a, 1100b, and 1100c. For example, the AP 1300 and the first through third camera modules 1100a, 1100b, and 1100c may be implemented in different semiconductor chips.

Image data generated from each of the first through third camera modules 1100a, 1100b, and 1100c may be provided to a corresponding one of the first through third subprocessors 1311, 1312, and 1313 through a corresponding one of first through third image signal lines ISLa, ISLb, and ISLc, which are separated from one another. For example, image data generated from the first camera module 1100a may be provided to the first subprocessor 1311 through the first image signal line ISLa, image data generated from the second camera module 1100b may be provided to the second subprocessor 1312 through the second image signal line ISLb, and image data generated from the third camera module 1100c may be provided to the third subprocessor 1313 through the third image signal line ISLc. Such image data transmission may be performed using, for example, a MIPI based camera serial interface (CSI), but embodiments are not limited thereto.

In an example embodiment, a single subprocessor may be provided for a plurality of camera modules. For example, differently from FIG. 15, the first and third subprocessors 1311 and 1313 may not be separated but may be integrated into a single subprocessor, and the image data provided from the first and third camera modules 1100a and 1100c may be selected by a selection element, for example, a multiplexer, and then provided to the integrated subprocessor.

The decoder 1320 may decode a bitstream provided to each of the first through third subprocessors 1311, 1312, and 1313. The decoder 1320 in FIG. 15 may perform a similar function to the decoder 310 in FIG. 1, and thus redundant descriptions will be omitted. Although the decoder 1320 is illustrated as a functional block separate from the first through third subprocessors 1311, 1312, and 1313, embodiments are not limited thereto. The decoder 1320 may be included in each of the first through third subprocessors 1311, 1312, and 1313. For example, the decoder 1320 may decode a bitstream in each of the first through third subprocessors 1311, 1312, and 1313.

The camera module controller 1330 may provide a control signal to each of the first through third camera modules 1100a, 1100b, and 1100c. A control signal generated by the camera module controller 1330 may be provided to a corresponding one of the first through third camera modules 1100a, 1100b, and 1100c through a corresponding one of control signal lines CSLa, CSLb, and CSLc, which are separated from one another.

One of the first through third camera modules 1100a, 1100b, and 1100c, for example, the second camera module 1100b may be designated as a master camera according to the mode signal or the image generation signal including a zoom signal, and the other camera modules, for example, the first and third camera modules 1100a and 1100c, may be designated as slave cameras. Such designation information may be included in a control signal and provided to each of the first through third camera modules 1100a, 1100b, and 1100c through a corresponding one of control signal lines CSLa, CSLb, and CSLc, which are separated from one another.

A camera module operating as a master or a slave may be changed under the control of the camera module controller 1330. For example, when the FOV of the first camera module 1100a is greater than that the FOV of the second camera module 1100b and the zoom factor indicates a low zoom ratio, the second camera module 1100b may operate as a master and the first camera module 1100a may operate as a slave. When the zoom factor indicates a high zoom ratio, the first camera module 1100a may operate as a master and the second camera module 1100b may operate as a slave.

In an example embodiment, a control signal provided from the camera module controller 1330 to each of the first through third camera modules 1100a, 1100b, and 1100c may include a sync enable signal. For example, when the second camera module 1100b is a master camera and the first and third camera modules 1100a and 1100c are slave cameras, the camera module controller 1330 may transmit the sync enable signal to the second camera module 1100b. The second camera module 1100b provided with the sync enable signal may generate a sync signal based on the sync enable signal and may provide the sync signal to the first and third camera modules 1100a and 1100c through a sync signal line SSL. The first through third camera modules 1100a, 1100b, and 1100c may be synchronized with the sync signal and may transmit image data to the AP 1300.

The AP 1300 may store the encoded image signal in the internal memory 1350 therein or the memory 1400 outside the AP 1300. Thereafter, the AP 1300 may read the encoded image signal from the internal memory 1350 or the memory 1400, decode the encoded image signal, and display image data generated based on a decoded image signal. The memory controller 1340 may generally control the internal memory 1350 and the memory 1400 such that the image data is stored in or loaded to the internal memory 1350 and/or the memory 1400.

At least one of the components, elements, modules or units (collectively "units" in this paragraph) represented by a block in the drawings, such as the mode selector 230, encoder 210, first interface 250, second interface 330, and decoder 310 in FIG. 1, may be embodied as various numbers of hardware, software and/or firmware structures that execute respective functions described above, according to an exemplary embodiment. For example, at least one of these units may use a direct circuit structure, such as a memory, a processor, a logic circuit, a look-up table, etc. that may execute the respective functions through controls of one or more microprocessors or other control apparatuses. Also, at least one of these units may be specifically embodied by a module, a program, or a part of code, which contains one or more executable instructions for performing specified logic functions, and executed by one or more microprocessors or other control apparatuses. Further, at least one of these units may include or may be implemented by a processor such as a central processing unit (CPU) that performs the respective functions, a microprocessor, or the like. Two or more of these units may be combined into one single unit which performs all operations or functions of the combined two or more units. Also, at least part of functions of at least one of these units may be performed by another of these units. Further, although a bus is not illustrated in the above block diagrams, communication between the units may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

While example embodiments have been illustrated and described above, it will be apparent to those skilled in the art that modifications and variations could be made without departing from the scope as defined by the appended claims and their equivalents.

What is claimed is:

1. An image compression method for compressing image data generated by an image sensor, the image compression method comprising:
    detecting a saturated pixel among a plurality of pixels included in a pixel group included in the image data, the saturated pixel having a pixel value exceeding a threshold value, and the plurality of pixels being adjacent to each other and having same color information;
    generating a saturation flag indicating a position of the saturated pixel;
    compressing the image data by comparing a reference pixel with at least one non-saturated pixel among the plurality of pixels included in the pixel group, the reference pixel being a non-saturated pixel among the plurality of pixels; and
    outputting a bitstream including the saturation flag, a compression result, and a compression method.

2. The image compression method of claim 1, wherein the generating of the saturation flag includes:
    setting the position of the saturated pixel to a bit 1's; and
    setting a position of the at least one non-saturated pixel to a bit 0's.

3. The image compression method of claim 1, wherein a position of the reference pixel is predetermined.

4. The image compression method of claim 3, wherein the reference pixel is compressed prior to the at least one non-saturated pixel.

5. The image compression method of claim 1, wherein the compressing of the image data includes obtaining a difference value between a non-saturated pixel value of the at least one non-saturated pixel and a reference pixel value of the reference pixel.

6. The image compression method of claim 5, wherein the reference pixel value corresponds to an average pixel value of pixels adjacent to each other and having same color information.

7. The image compression method of claim 5, wherein the reference pixel value of the reference pixel corresponds to a median pixel value of pixels adjacent to each other and having same color information.

8. The image compression method of claim 1, wherein
    the bitstream includes a header field, and
    the header field includes the compression method.

9. The image compression method of claim 1, wherein the threshold value is at least 95% of an amount of information represented by the plurality of pixels.

10. The image compression method of claim 1, wherein the outputting of the bitstream includes determining whether to output the saturation flag and the compression result based on a mode signal instructing to compress the plurality of pixels included in the image data except for the saturated pixel.

11. The image compression method of claim 10, wherein the outputting of the bitstream further includes outputting the bitstream regardless of the mode signal based on at least two saturated pixels being detected.

12. A processor comprising an encoder for processing image data generated by an image sensor, the encoder configured to:
    detect a saturated pixel among a plurality of pixels included in a pixel group, the saturated pixel having a pixel value exceeding a threshold value, and the plurality of pixels being adjacent to each other and having same color information;
    generate a saturation flag indicating a position of the saturated pixel; and
    compress the image data by comparing a reference pixel with at least one non-saturated pixel among the plurality of pixels included in the pixel group, the reference pixel being a non-saturated pixel among the plurality of pixels.

13. The processor comprising the encoder of claim 12, wherein a position of the reference pixel is predetermined.

14. The processor comprising the encoder of claim 12, wherein the pixel group includes four pixels.

15. The processor comprising the encoder of claim 12, wherein the pixel group includes nine pixels.

16. The processor comprising the encoder of claim 12, wherein the encoder is further configured to determine whether to compress the image data based on a mode signal instructing to compress the plurality of pixels included in the image data except for the saturated pixel.

17. The processor comprising the encoder of claim 12, wherein the threshold value is at least 95% of an amount of information represented by the plurality of pixels.

18. An electronic device capturing an image, the electronic device comprising:
    an image sensor including a pixel array and configured to output image data;
    an image signal processor including an encoder, the encoder being configured to:
        detect a saturated pixel among a plurality of pixels included in a pixel group, the saturated pixel having a pixel value exceeding a threshold value, and the plurality of pixels being adjacent to each other and having same color information;
        generate a saturation flag indicating a position of the saturated pixel;
        compress the image data by comparing a reference pixel with at least one non-saturated pixel among the plurality of pixels included in the pixel group, the reference pixel being a non-saturated pixel among the plurality of pixels; and
        output a bitstream including a compression result, the saturation flag, and a compression method; and
    an application processor including a decoder, the decoder being configured to reconstruct the image data by decoding the bitstream.

19. The electronic device of claim 18, wherein the decoder is further configured to decode the at least one non-saturated pixel based on data reconstructed at a predetermined position of the reference pixel.

20. The electronic device of claim 18, wherein the decoder is further configured to reconstruct the saturated pixel to a predetermined saturation value.

\* \* \* \* \*